(12) United States Patent
Li et al.

(10) Patent No.: US 11,483,492 B2
(45) Date of Patent: Oct. 25, 2022

(54) IMMERSIVE VIDEO EXPERIENCE INCLUDING ROTATION

(71) Applicant: Loop Now Technologies, Inc., Redwood City, CA (US)

(72) Inventors: Wuhsi Li, Somerville, MA (US); Vincent Yang, Redwood City, CA (US); Jerry Luk, Menlo Park, CA (US); Cory Grenier, Marina del Ray, CA (US); June Kim, Daly City, CA (US); Ethan Fan, San Jose, CA (US); Lucas Alves, Rio de Janeiro (BR); Ben Hansen, Emerald Hills, CA (US); Chen Li, San Jose, CA (US); Shawn Samra, Berkeley, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 16/865,985

(22) Filed: May 4, 2020

(65) Prior Publication Data
US 2020/0267333 A1 Aug. 20, 2020

Related U.S. Application Data

(63) Continuation-in-part of application No. 16/423,332, filed on May 28, 2019, now Pat. No. 10,645,331.

(60) Provisional application No. 62/801,987, filed on Feb. 6, 2019, provisional application No. 62/929,584, filed on Nov. 1, 2019.

(51) Int. Cl.
*H04N 5/272* (2006.01)
*H04N 5/262* (2006.01)
*G06T 3/40* (2006.01)

(52) U.S. Cl.
CPC ......... *H04N 5/2628* (2013.01); *G06T 3/4007* (2013.01); *G06T 3/4023* (2013.01); *H04N 5/272* (2013.01)

(58) Field of Classification Search
USPC ........................................................ 348/68
See application file for complete search history.

(56) References Cited

U.S. PATENT DOCUMENTS

| 3,069,414 | A1 | 11/2011 | Hartwig et al. |
| 8,244,707 | B2 | 8/2012 | Lin et al. |
| 8,572,490 | B2 | 10/2013 | Hartwig et al. |

(Continued)

FOREIGN PATENT DOCUMENTS

KR 101606860 B1 3/2016

*Primary Examiner* — Mikhail Itskovich
(74) *Attorney, Agent, or Firm* — Adams Intellex, PLC

(57) ABSTRACT

Techniques for video manipulation based on an immersive video experience including rotation are disclosed. Parameters pertaining to a video are determined. Second parameters pertaining to a video display are determined. A minimum scale value is calculated to inscribe a rectangle within an oval based on a height and a width of the video. A height and a width of the video display define the rectangle. A gravity sensor input is preprocessed using a low-pass filter before using it to determine the minimum scale value. The video is preprocessed using a video inset and a viewport inset. The video can be trimmed, and the rectangle can be scaled. A rectangular portion of the video is rendered on the video display wherein the rectangular portion is on or inside the boundaries of the oval.

24 Claims, 27 Drawing Sheets

(56) References Cited

U.S. PATENT DOCUMENTS

| | | | |
|---|---|---|---|
| 9,118,712 | B2 | 8/2015 | McCoy et al. |
| 9,532,116 | B2 | 12/2016 | Terpe |
| 9,824,372 | B1 | 11/2017 | Seth et al. |
| 10,089,402 | B1 | 10/2018 | Winkler et al. |
| 2006/0253797 | A1* | 11/2006 | Madan .................. G06F 3/1423 715/792 |
| 2013/0021373 | A1 | 1/2013 | Vaught et al. |
| 2013/0276021 | A1 | 10/2013 | Cho |
| 2015/0195175 | A1 | 7/2015 | Kariman |
| 2016/0065929 | A1 | 3/2016 | Barcons-Palau et al. |
| 2016/0088369 | A1 | 3/2016 | Terpe |
| 2016/0093105 | A1 | 3/2016 | Rimon et al. |
| 2017/0109019 | A1* | 4/2017 | Lei ........................... G06F 1/163 |
| 2018/0253765 | A1 | 9/2018 | Avedissian et al. |
| 2018/0288396 | A1 | 10/2018 | Bouazizi et al. |

\* cited by examiner

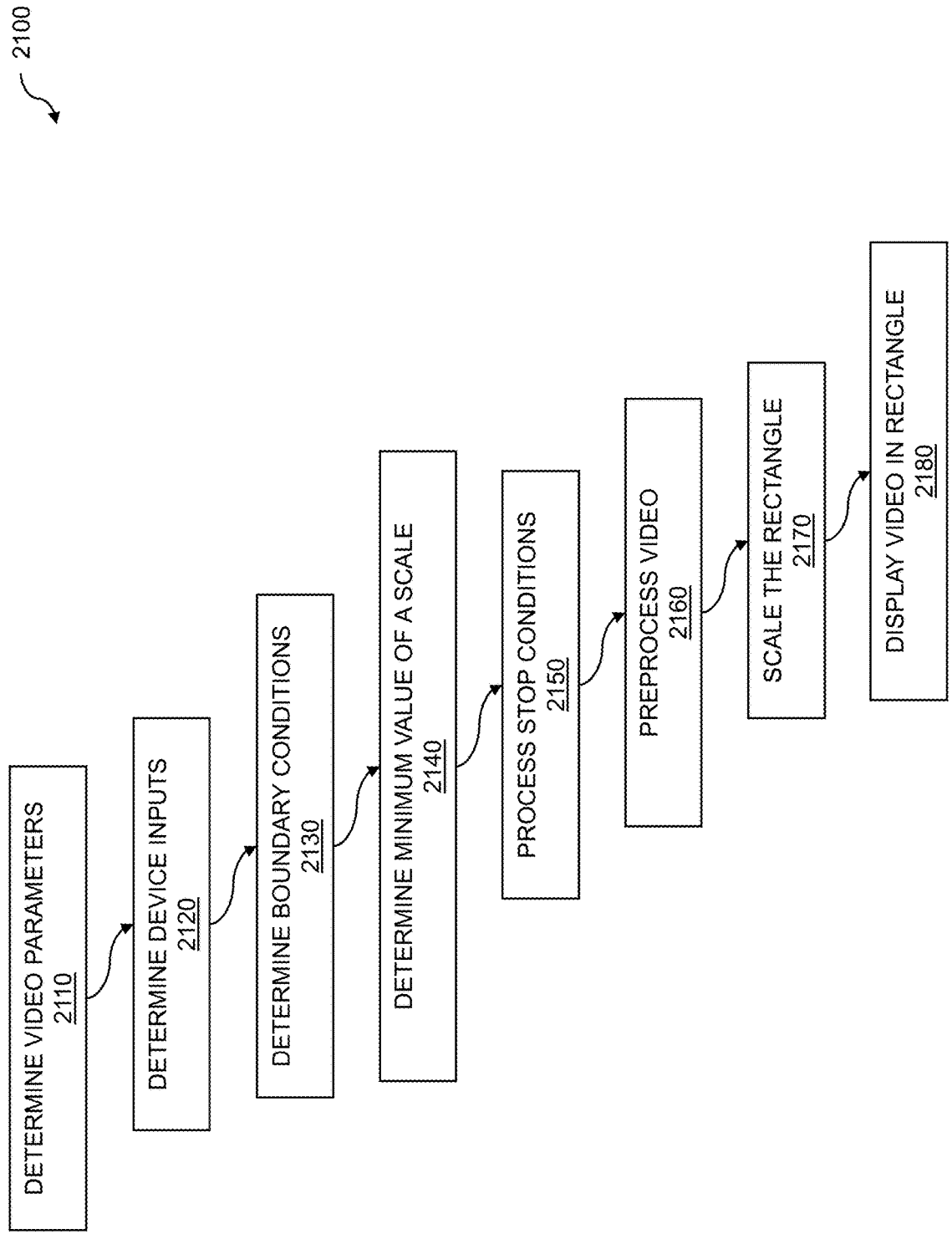

IMMERSIVE VIDEO EXPERIENCE INCLUDING ROTATION

RELATED APPLICATIONS

This application claims priority to U.S. patent application "Immersive Video Experience" Ser. No. 16/423,332, filed May 28, 2019 which claims the benefit of U.S. provisional patent application "Immersive Video Experience" Ser. No. 62/801,987, filed Feb. 6, 2019. This application also claims the benefit of U.S. provisional patent application "Immersive Audio-Visual Experience" Ser. No. 62/929,584, filed Nov. 1, 2019.

Each of the foregoing applications is hereby incorporated by reference in its entirety.

FIELD OF ART

Implementations disclosed herein relate generally to video manipulation and specifically to an immersive video experience including rotation.

BACKGROUND

People love watching, experiencing, and interacting with videos, games, and other video content. While listening to audio presentations such as concerts, podcasts, radio stations, and other audio sources can be quite enjoyable, most people prefer the more immersive experience they gain by adding video to the presentation or game. The videos that people watch can be short, long, useful, silly, etc. While many of the video viewing experiences can include meaningful activities such as research, education, training, work, or information gathering, among many others, more often than not the viewing of videos occurs for diversion, entertainment, gaming, or just passing the time. Watching videos can be competitive or even addictive, with some viewers competing to determine how many cat videos they can tolerate watching in one sitting, and others binge-watching all eight seasons of a popular fantasy drama for days on end. Access to some of the video that is available for viewing is free, while other video content requires a one-time payment or a subscription. Many providers of video content start their own channels and can become quite popular. The most popular providers can even make a living at providing their particular video content. Such "influencers" are paid by subscription, by advertisers, or by others.

People use a wide range of electronic devices to engage with a wide range of video content. The video content can be found at various websites, streamed from online services, or purchased for download. To access a particular website, a person starts a web browser on her or his electronic device and navigates to the website by typing in a web address or universal resource locator (URL). The URL takes the person to a home or landing page. The website homepage provides access to videos that include content such as news, sports, politics, adorable puppy videos, kittens doing wacky things videos, cute children videos, angry or satirical rants, and much, much more. The person can click on a video related to sports scores, conspiracy theories, or whatever video is of interest to her or him. From a user perspective, finding interesting videos, games, news, scores, etc., often begins with navigating to a familiar website. Alternatively, the user can perform a general web search or a search on a particular site. The manner in which the user composes their search can have an immense impact on the success or failure of the search. Having at one time been described as a library with its entire collection strewn on the floor, searching for interesting videos, games, etc., on the web or even on a particular website poses significant challenges to finding a particular item or content of interest. An ill-composed search based on a particularly remembered title or name generates far too many "potential" results or hits. The sheer volume of results is far, far too large to be useful or meaningful to the person. From the customer perspective, the searcher wants to find the desired videos simply and immediately. From a provider perspective, such as an online streaming service, their business succeeds or fails based on presenting videos to prospective customers that the customers want to see. The search needs to present relevant results quickly and concisely to the potential customer. If not, the customer will go elsewhere or will simply give up due to loss of interest, patience, or lack of time.

SUMMARY

Individuals use a wide range of electronic devices, such as desktop computers, laptop computers, tablets, smartphones, and PDAs, when they want to observe and interact with video content. The video content, rendered within web browsers as web pages, video viewing apps, games, etc., presents news, government information, entertainment, educational material, and so on. The web content typically includes text, videos including live-feed video, audio, and the like. As an individual interacts with video content such as a game, the individual will often tilt, rotate, or otherwise display the screen on which the video content is viewed. Such rotation, translation, etc. of the display can result in a viewing angle or direction not handled by the video, such as panning right beyond the boundary of the video. To handle such situations, such as those commonly encountered in gaming or other interactivities, extended portions of the video can be filled with video image data. The video image data can be generated by image processing, machine learning, and so on.

The video playback technology disclosed herein gives a full screen immersive experience to users when they watch videos on mobile devices which are used to watch the video. Specifically, an implementation of the technology disclosed herein gives a continuous all-time immersive experience by treating the screen of the mobile device as a window to watch a wide-angle video. As the screen of the mobile device is rotated, video image data is generated to fill the extended portions of the video. In one implementation, the video also zooms in and out of the display during rotation of the smartphones, to give users a sense of getting closer to or farther from the video. One or more implementations disclosed herein use inputs from gravity sensors including magnetic sensors, gyroscopes, accelerometers, etc., to determine the amount of zooming in and out, shifting, or rotating for the video in response to various movements by the user, such as rotating, moving, and tilting, of the video display device. Implementations disclosed herein allow users to view videos with no constraints as to which orientation the video was taken (e.g. portrait or landscape) and which orientation is used to watch it. For any video, the video playback technology disclosed herein allows the viewer to watch a video on a viewing device in portrait or landscape mode or any angle in between. As the user rotates the viewing device, the extended portions of the video beyond the edges of the video can be filled with video data. The video data can be generated using techniques including image processing, machine learning, and so on.

Video manipulation is based on an immersive video experience that includes rotation. A computer-implemented method for video manipulation comprises: determining a plurality of parameters pertaining to a video and a second plurality of parameters pertaining to a video display on a device; calculating a minimum scale value to inscribe a rectangle within an oval based on a height and a width of the video and wherein a height and a width of the video display define the rectangle; and rendering a rectangular portion of the video on the video display wherein the rectangular portion is on or inside boundaries of the oval. The oval can be based on a scaled height and a scaled width of the video. The boundaries of the oval can be defined by the height and the width of the video or by the scaled value of the height and the scaled value of the width of the video. The scaled value of the height and the scaled value of the width of the video can provide expansion of the video, where the expansion of the video can maximize a visible area of the video within a video display. The rendering the video includes displaying the video on a video display. A video mask can be communicated to the user, where the video mask can be overlaid on the video. The overlaying the visible video mask can occur on a video recording device screen

BRIEF DESCRIPTION OF THE DRAWINGS

The following detailed description of certain embodiments may be understood by reference to the following figures wherein:

FIG. 21 illustrates example operations of a system for providing an immersive video experience in a manner disclosed herein.

DETAILED DESCRIPTION

Figure 1:
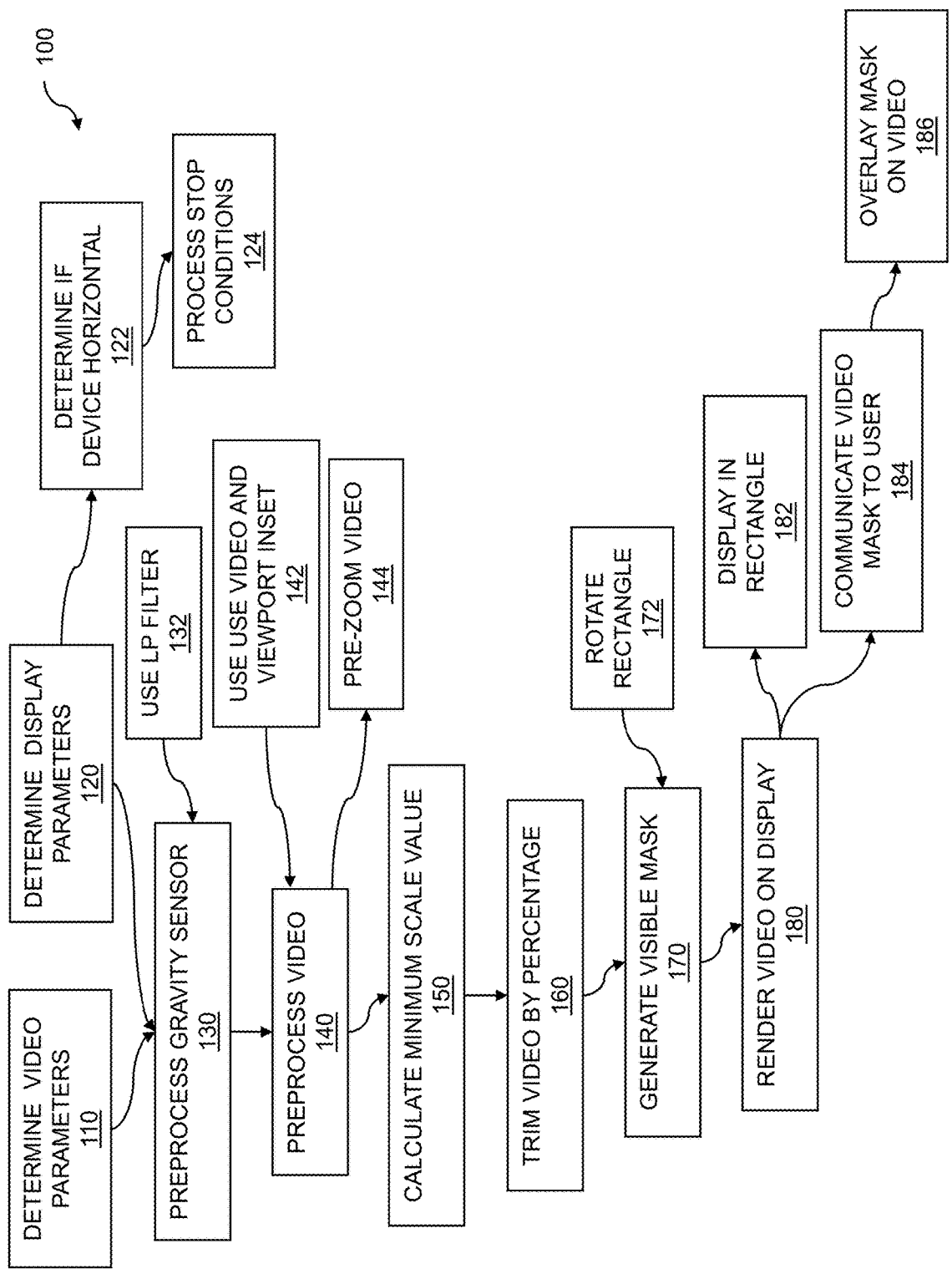
FIG. 1 is a flow diagram for an immersive video experience.

Techniques for video manipulation based on an immersive video experience including rotation are disclosed. An individual can view a video using a display coupled to an electronic device such as a desktop computer, a laptop computer, a tablet, a smartphone, a personal digital assistant (PDA), a gaming console, and so on. The video can include a webpage, a video presentation, a video game, etc. Depending on various parameters such as video size or resolution; and display size, resolution, or orientation; the user may be presented with a "window" into the video rather than a full view of the video. Analogous to looking into a landscape using binoculars, the user may be presented with a partial view of the video rather than the full view. Further, if the screen on which the user is viewing the video is small or comprises an aspect ratio different from that of the video, the video can be scaled to improve the video viewing experience. Here, the scaling can include zooming in, zooming out, insetting a viewport into the video, etc. The user can then rotate the display in order to change the view of the video seen through the window. While this technique can work well, the user can "run out of view" if the rotation of the display would present the user with a view "outside" or beyond the edges of the of the video. To counteract this problem, extended portions of the video, that is, those portions beyond the edges of the video, can be filled in. The filling can be accomplished by generating video image data, where the generating can be accomplished using image processing techniques such as data interpolation (filling in) or data extrapolation (extending). The video-extended portions of the video can also be filled in using machine learning, where the machine learning can fill in video based on a scene, can predict video image data, etc. Thus, if a user playing a video game enters a room within the game and rotates the display to the right to look in that direction, a view can be presented to the user by filling in that extended portion of the video.

While conventional video viewing refers to simply staring at the mobile device displaying the video, the technology disclosed herein transforms video viewing into an interactive and participatory experience. The approach disclosed herein provides the users an immersive viewing experience irrespective of how the video is recorded and/or enables the viewer to rotate, move, and tilt the mobile device used to view the video while watching the video. As a result, such an immersive viewing experience is no longer exclusive to videos recorded using panoramic/spherical videos or viewed using VR (virtual reality) devices.

The video playback technology disclosed herein provides an immersive video viewing experience for videos recorded by generic mobile devices and delivers a smooth video rendering even when the viewer is rotating, moving, and tilting the viewing device as part of the interaction. Specifically, a good/smooth viewing experience may be defined where:

(a) The video stays in bound: the user cannot see outside the video, which results in an undesirable partial black screen;
(b) The user can zoom in only when necessary: to enable the user to view as much of the video as possible;
(c) A stable view: to avoid dramatic movement or scaling on rotating or tilting;
(d) A smart view: when only a partial view of the video is visible, showing the significant part if possible;
(e) Video quality is ensured in every angle.

To provide the immersive experience, a geometric-based system is designed in order to achieve one or more of the above results. An implementation of the video playback technology disclosed herein obtains various parameters of the video including the following:

(1) Size of video (width and height, defined in pixels),
(2) Size of viewport (width and height, defined in pixels),
(3) θ, the rotating angle of viewport, and
(4) a, the scale factor.

FIG. 1 is a flow diagram for an immersive video experience including rotation. Videos, which can include a variety of video formats, resolutions, durations, and the like, can include various media types. The media types can include news videos or video clips, entertainment videos, political message videos, educational videos, and so on. A given video can include video associated with gaming, a virtual or virtual reality (VR) environment, an augmented or augmented reality (AR) environment, a mixed or mixed reality (MR) environment, etc. A video can be rendered within a shape appropriate for presentation on a video display, where the shape can include a geometric shape such as an oval. The video display can include a projector, television, computer screen, gaming console, personal electronic device screen, and so on. The video display can include a display that is wearable such as an AR, VR, or MR headset. The videos that are displayed can be scaled, trimmed, filled in, rotated, moved, adjusted in terms of resolution, and the like, prior to viewing on a display used by an individual. The scaling, trimming, filling in, adjusting, etc., serve to enhance the video viewing experience by avoiding movement or scaling of a video as the video is being observed by a user. The rotation can be in reference to rotation of the electronic device used by the individual to view the video. The video can be provided by a video content provider or can be obtained from a video server. The content provider or the video server can be based a variety of server techniques such as a cloud server, a mesh server, or a decentralized video server. The video further can be presented with text or audio.

The flow 100 includes determining a plurality of parameters pertaining to a video 110. The videos can include a variety of media content such as movies, television, news programs, sporting events, educational programs, public service announcements, and the like. The videos can be of long or short duration, can comprise various resolutions, can include a video or gaming genre, etc. The videos or other media content can entertain; pitch a product; present a story; provide an advertisement or a political message; or conduct an educational segment; etc. The flow 100 includes determining a second plurality of parameters pertaining to a video display 120. The display can comprise a device for video playback such as a computing device, a video player such as a DVD™ or Blu-Ray™ player, a game console, a set-top box (STB), etc. The parameters associated with displays can include resolution information such as 8K, 4K, 2K (1440P), 1080P, 720P, and the like. The parameters can include one or more color settings for a particular display, where a color setting can be selected based on a color temperature, on the content of the video, etc. The color settings can include a natural setting, a photograph setting, a movie setting, a gaming setting, etc. The color settings can include brightness, contrast, sharpness, and the like. In embodiments, the parameters associated with a display can be used to select a video content resolution, temperature, length, etc., appropriate for a given video display. The flow 100 further includes determining if the video device is substantially horizontal 122. Discussed below, the attitude of the display, such as rotation, tilt, acceleration, etc., can be scaled to adjust the video displayed on the video display. The flow 100 includes processing various stop conditions 124 in response to determining that the device is substantially horizontal. The device can be substantially horizontal as a result of a user removing a video device they were wearing such as virtual reality (VR) goggles, closing a laptop, placing a tablet or smartphone on a table, laying down a gaming device, etc.

The flow 100 includes preprocessing a gravity sensor 130 input. A gravity sensor can be found within a variety of electronic devices such as personal electronic devices including tablets, smartphones, PDAs, handheld gaming devices, and the like. The gravity sensor can be coupled to a wearable video display, a portable video display coupled to a personal electronic device such as a tablet or smartphone, etc. The gravity sensor can be used to determine a tilt or attitude of the video display. In the flow 100, the preprocessing a gravity sensor input uses a low-pass (LP) filter 132. The low-pass filter can include a digital filter and can be implemented using finite impulse response (FIR) techniques, infinite impulse response (IIR) techniques, and the like. The low-pass filtering can be accomplished using an analog technique, a filtering app, and the like. The LP filter can be used to remove noise from a signal obtained from the gravity sensor. In embodiments, the low-pass filter can be employed before using the gravity sensor to determine the minimum scale value to inscribe a rectangle in an oval. The flow 100 includes preprocessing the video 140. The preprocessing the video can include expanding or shrinking the video (zooming in or zooming out), cropping the video, changing aspect ratio, rotating the video, and so on. In the flow 100, preprocessing the video uses at least one of a video inset and a viewport inset 142. A video inset can include embedding an object such as a video within the video, superimposing text, and so on. A video viewport inset can include showing the video in a vertical or portrait mode, showing the video in a horizontal or landscape mode, showing the video within a shape such as an oval or a rectangle, and the like. The flow 100 further includes pre-zooming 144 and maintaining the video at a predetermined fixed scale. The pre-zooming of the video can be used to improve the viewing experience of a video on a particular video display. In a usage example, a movie or TV program can be pre-zoomed such that the actors are enlarged to make viewing the movie or program on a smartphone or PDA a better experience. The pre-zooming can be maintained throughout the viewing of the video on the smartphone or PDA.

The flow 100 includes calculating a minimum scale value 150 to inscribe a rectangle within an oval, based on a height and a width of the video. The oval can be associated with a video display, where the dimensions of the oval can be dependent on the parameters pertaining to the video display. In embodiments, the oval can be based on a scaled height and a scaled width of the video. The scaled height and scaled width of the video can be based on zooming in, zooming out, and so on. In other embodiments, the height and the width of the video define boundaries of the oval. In a usage example, the video may include a low-resolution GIF of MPEG-4 video which can be shown within a portion of a display rather than filling the display. The parameters pertaining to the video display can include an aspect ratio such as 4:3, 16:9, letterbox, etc. In embodiments, a height and a width of the video display define the rectangle. The rectangle can be vertically oriented such as portrait format, horizontally oriented such as landscape format, and so on. In embodiments, the rectangle can be defined by the width and the height of the device viewing area. Other shapes may be based on a scaled height and a scaled width. In other embodiments, a scaled value of the height and a scaled value of the width of the video can define boundaries of the oval. The height and width of the video can be a native or "unedited" version of the video, an adjusted or trimmed height and width, etc.

In embodiments, the scaled value of the height and the scaled value of the width can provide expansion of the video. Similarly, the scaled value of the height and the scaled value of the width can provide compression of the video. Discussed throughout, the scaling of the video can enhance an experience of viewing the video. In embodiments, the expansion of the video can maximize a visible area of the video within the video display. The maximizing the viewing area of the video can include zooming in, cropping the video, expanding the video by synthesizing peripheral areas, etc. Recall that the video can include dimensions, resolutions, etc., that are different from the dimensions, resolutions, etc. of the display on which the video is viewed. As a result, the maximizing the viewing area can extend beyond the boundaries of the video. Further embodiments include filling extended portions of the video with video image data. Discussed below, the data that can be used for filling extended portions of the video can be calculated, estimated, looked up, etc. In embodiments, the filling is accomplished by generating the video image data by image processing. The image processing can include interpolating data, extrapolating data, and so on. In other embodiments, the filling is accomplished by generating the video image data by machine learning. The machine learning can be used to provide data for extending the video based on matching data within the video, predicting what data could be included in the extended portions of the video, etc. In other embodiments, the filling covers peripheral regions of a video display beyond the original video. The peripheral regions beyond the original video can include video above or below the original video, or left or right of the original video; detail within a zoomed in video; background for a zoomed-out video; etc. In embodiments, the peripheral regions are exposed when the video display is rotated. In a usage example, an individual playing a game enters a room then rotates the video display to the right. The peripheral region to the right can be filled in based on the generated data.

In further embodiments, a height and a width of the video display define the rectangle. The height and the width of the video display can be based on the physical dimensions of the display, the resolution dimensions of the display, and the like. Embodiments can include scaling the rectangle by $\alpha$.

The $\alpha$ can be computed, chosen, estimated, or otherwise determined. In embodiments, the $\alpha$ can be determined by:

$$\frac{(0.5\alpha \times \text{view width} \times \cos\theta + 0.5\alpha \times \text{view height} \times \sin\theta)^2}{(0.5 \times \text{video width})^2} + \frac{(0.5\alpha \times \text{view width} \times \sin\theta - 0.5\alpha \times \text{view height} \times \cos\theta)^2}{(0.5 \times \text{video height})^2} \leq 1$$

The rectangle determined a can be used for displaying the video. Embodiments can include displaying the video in the rectangle.

The flow 100 further includes trimming 160 a wide side of the video by a predetermined percentage. The wide side of the video can be trimmed using a variety of video manipulation techniques and can be used to change an aspect ratio of the video from 16:9 to 4:3, to convert a video to portrait mode, etc. The flow 100 further includes generating a visible video mask 170. The visible mask can be displayed with the video, superimposed on the video, and so on. The flow 100 includes generating the visible video mask by rotating the rectangle 172. The rotating the visible mask can result from changing a viewport of a video from a landscape viewport to a portrait viewport. The rotating the visible mask can result from rotating the display on which the video is seen. The visible mask can be used to provide viewing cues to a user. In a usage example, the visible mask can be used as a visual cue to a user who wants to make a recording of a video. The visible mask can also be used to show results of video compression or video expansion techniques. The visible mask can be used to record videos, and/or for video compression purposes. The visible video mask can further be used to mark or highlight a boundary of a video to be or being recorded.

The flow 100 includes rendering a rectangular portion of the video on the video display 180 wherein the rectangular portion is on or inside the boundaries of the oval. The rectangular portion of the video can include a portrait orientation or layout, a horizontal orientation or layout, a square representation, and so on. The boundaries of the oval can include the boundaries of the display on which the video is seen. This further includes displaying the video in the rectangle 182. The rectangle can include a rectangle associated with the native size of the video, a rectangle that maximizes the viewing of the video, etc. The flow 100 further includes communicating the visible video mask to a user 184. The visible mask can be horizontal, vertical, square, rotated, etc. The visible mask can guide the user while the user is recording a video. Other embodiments include overlaying the visible video mask 186 on a video recording device screen. The video that is rendered on a video display can be zoomed. Embodiments can include zooming in or out the video on a device display during rotation of the device. The rotation of the device can include rotation around an x-axis, a y-axis, or a z-axis. The rotation of the device can be based on a user who is using a wearable device such as VR goggles moving their head in 3-D space. In embodiments, the zooming in or out can give a user a sense of getting closer to or farther from the video. The getting closer to or farther from the video can be based on approaching or leaving an object within the video, moving around in a space represented by the video, and the like. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
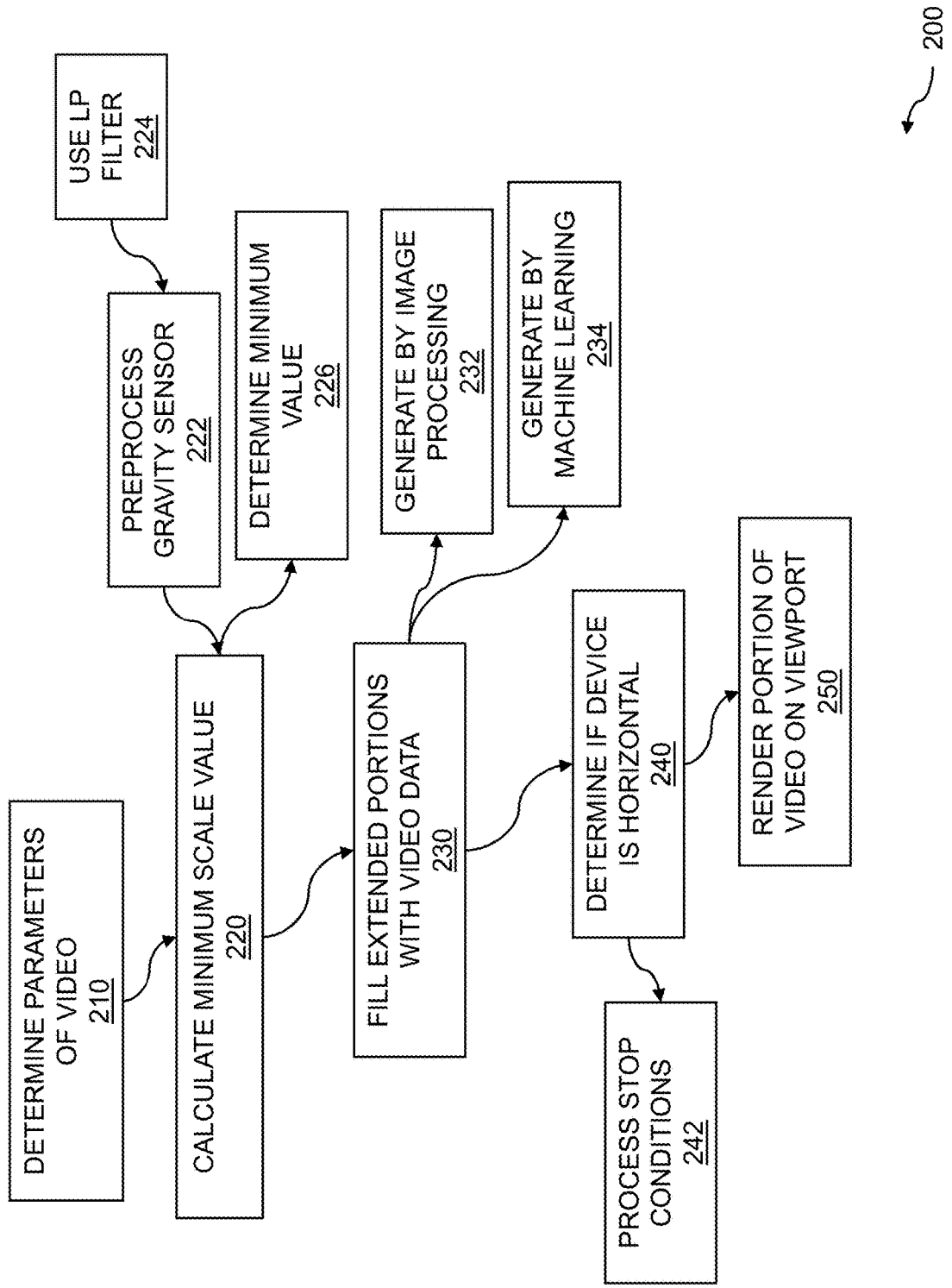
FIG. 2 is a flow diagram for determining parameters.

FIG. 2 is a flow diagram for determining parameters. The parameters can be associated with a video, a video display, a video recorder, and so on. The determining parameters enables an immersive video experience including rotation. The flow 200 includes determining various parameters of the video 210. A variety of parameters of the video, such as production data, ownership, digital rights management (DRM) information, contact information, modification history, revision or version number, and the like, can be determined. In embodiments, the determining various parameters of the video include the size of the video, the size of a viewport, a rotating angle of a viewport, and a scale factor. The size of the video can include storage requirements. Further parameters can include video resolution, duration of the video, etc. In embodiments, the determining can include determining various inputs from a device that can display the video. The device that can display the video can include a projector, a monitor; a display coupled to an electronic device such as a desktop or laptop computer, tablet, or smartphone; a wearable display; and the like. The determining inputs can further include determining inputs from an accelerometer, a gyroscope, a magnetometer, an optical sensor, etc. The accelerometer and the gyroscope can be used to determine linear acceleration, angular acceleration, etc. Embodiments can include determining one or more boundary conditions. The boundary conditions can include a viewport, a zoom factor, and the like. A viewport can include a position of the video such as an upright or portrait position, a horizontal or landscape position, and so on. A video viewport of a video in a portrait position can be displayed in an original or unscaled form. The unscaled form of the video can include a resolution of 1280×720. A viewport of a video in a landscape position can be scaled. In embodiments, the scaling of the view for a horizontal viewport can include scaling the video from 1280×720 to 720×405. The zoom factor can be determined to enhance the viewing experience of the video. The zoom factor can be based on determining a maximal and a minimal scale by scanning through all viewing angles of a video. The zoom factor can be defined as the ratio between maximal scale and minimal scale.

The flow 200 includes using the various parameters, inputs, and boundary conditions to calculate the minimum scale value 220. A minimum scale can be used to enhance a viewing experience of a person viewing a video by using the minimum scale to reduce dramatic movement or scaling of the video as a viewer of the video rotates the viewport of the video. The minimum scale that is determined can be used to fit a rectangular video within an oval view. In the flow 200, the rendering includes preprocessing a gravity sensor input 222. The gravity sensor, which can be coupled to a wearable video display or a video display coupled to a personal electronic device such as a tablet or smartphone, etc., can be used to determine a tilt of the video display. The flow 200 further includes using a low-pass filter 224 to determine the minimum scale value. The low-pass filter can be based on a variety of filtering techniques including finite impulse response (FIR) filter techniques, infinite impulse response (IIR) filter techniques, and the like. The low-pass filter can be based on analog filter techniques, an app, etc. In the flow 200, the output of the gravity sensor, filtered by the low-pass filter, can be used to determine the minimum scale value 226.

The flow 200 further includes filling extended portions of the video with video image data 230. The filling extended portions of the video can be based on various techniques including data lookup techniques, processing techniques, and so on. The filling extended portions of the video can include determining video data that is "out of view" of the rectangle within the oval. In the flow 200, the filling can be accomplished by generating the video image data using image processing 232. Image processing techniques can include data interpolation, data extrapolation, and so on. In the flow 200, the filling can be accomplished by generating the video image data by machine learning 234. The machine learning can be used to "predict" what image data can be included within the extended portions of the video. The predicted data can include data related to a scene such as an urban scene or a wilderness scene, buildings, people, or characters within the video, and so on.

The flow 200 includes determining if the device is substantially horizontal 240. The determining that the device is substantially horizontal can be determined based on received inputs from the accelerometer and the gyroscope. The determining that the device is substantially horizontal can include receiving inputs from the gravity sensor. The flow 200 further includes processing one or more stop conditions 242 in response to determining that the device is substantially horizontal. A stop condition can include stopping displaying of a video. A stop condition can be based on detecting that the video display is located on a horizontal surface such as a desk, counter, or sofa. The determining that the device is substantially horizontal can include determining that a user has removed a wearable display device and set it down.

The flow 200 further includes rendering a rectangular portion of the video on the viewport 250 such that at least two vertices of the rectangular portion are on a boundary of the oval. Recall that a video, which can be rectangular, can be displayed within an oval. The viewport of the video can include a portrait or a landscape viewport. Depending on the viewport, the video can be scaled. By rendering the portion of the video on the viewport with two vertices of the rectangular portion on a boundary of the oval, the user can move their head up or down and left or right to see portions of the video that were previously "out of view". In a usage example, a user who is using a wearable display to view an imagined world with a game can move their head left or right to view left or right respectively. Similarly, the user can move their head up or down to view up or down within the video. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
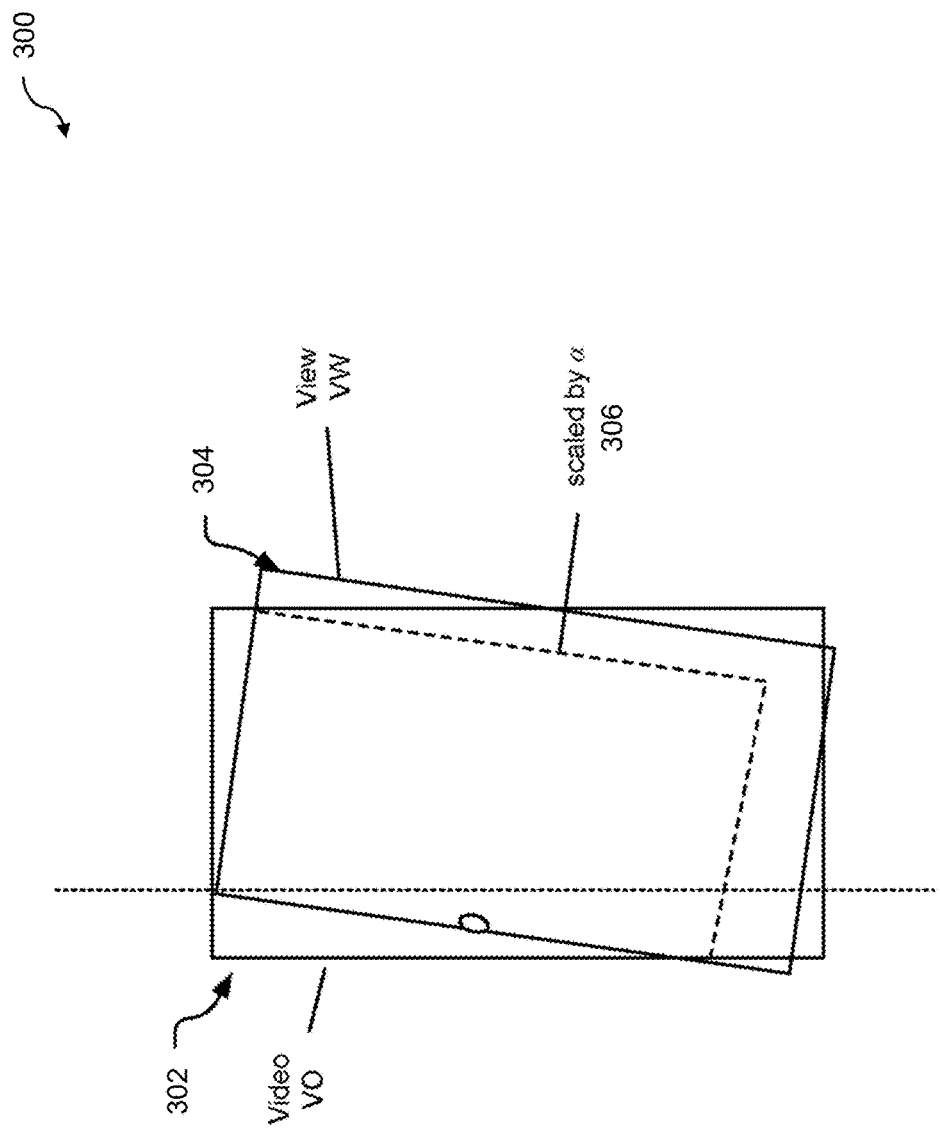
FIG. 3 illustrates an example configuration of a viewing system disclosed herein as transformed into a geometric problem.

FIG. 3 illustrates an example configuration of a viewing system disclosed herein as transformed into a geometric problem. The transforming the configuration of the viewing system into a geometric problem enables an immersive video experience including rotation. As a user rotates an electronic device such as a smartphone, tablet, etc., the view of the video can also rotate. If the video is to remain visible on the display, the rotated video can be scaled so that the video can still be viewed. The transforming of the viewing system into a geometric problem is illustrated by 300 in FIG. 3. The video is represented by a rectangle VO 302, and the view of the video is represented by another rectangle VW 304. The rectangle VW cam be rotated by an angle θ. Note that the rotated video represented by 304 does not fully overlap the rectangle 302. Thus, the video must be scaled (here, reduced in size) in order to be fully visible within rectangle 302. In the figure, the video can be scaled by a. The scaled video can be placed into VO 306. The video and view can both be standard portrait with 720p (720×1280).

Figure 4:
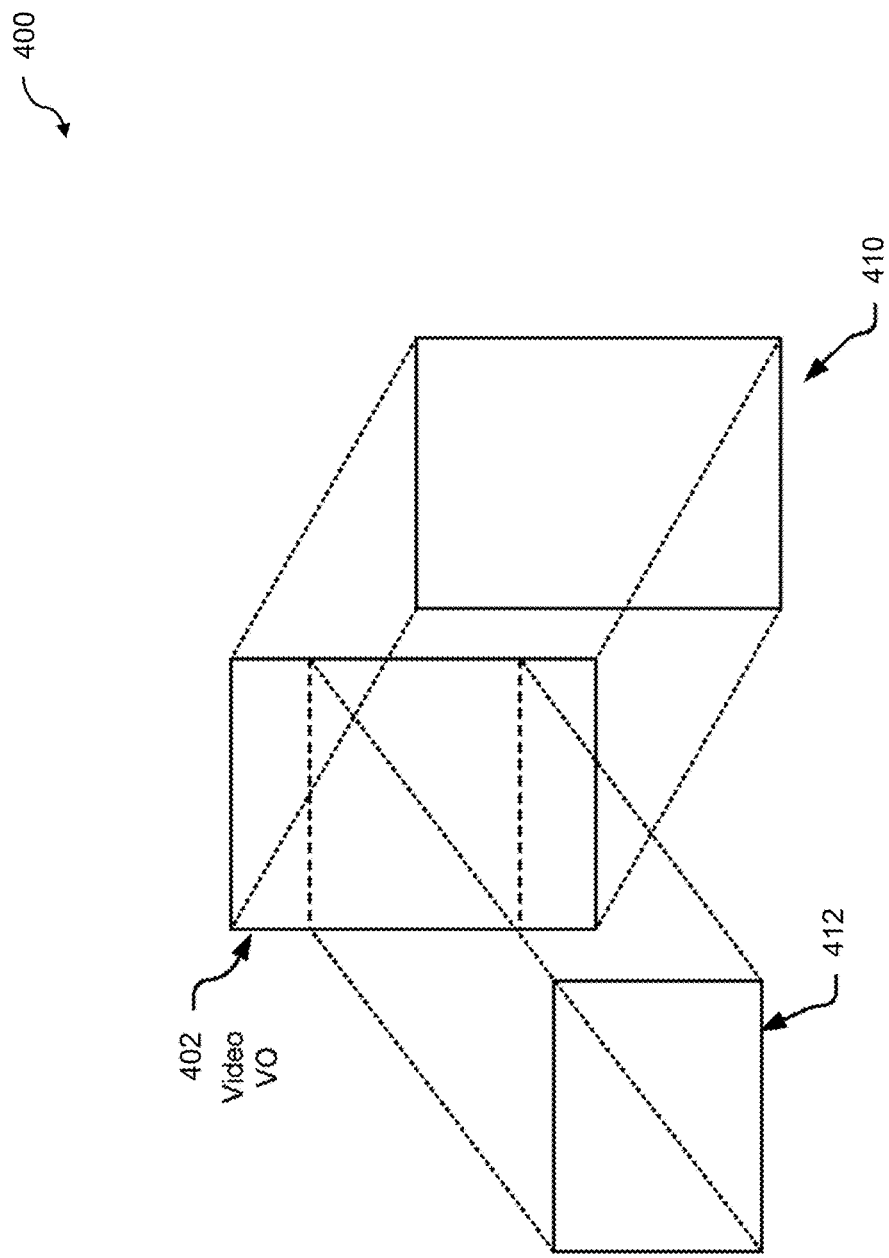
FIG. 4 illustrates an example viewport with the viewport in landscape and portrait modes.

FIG. 4 illustrates an example viewport with the viewport in landscape and portrait modes. A viewport can enhance an immersive video experience including rotation. FIG. 4 illustrates a viewport 400. A viewport can be oriented in an upright or portrait position. If the viewport is in upright portrait position 410, then no scaling of the video is necessary, and the system can display the original video 402. If the viewport is in a horizontal or landscape position 412, then the video can be scaled. The scaling of the video can include scaling from a (1280×720) to a (720×405) representation in order to fit it in the video into the viewport. The scaling of the video can result in a viewing area that is 31.6% of the original video. A scale of 77.8% can be required to ensure that the viewport remains in bounds of the video. With regard to a zoom factor, dramatic movement within or scaling of the video should be avoided to ensure a smooth viewing experience when the viewer rotates the viewport. Assuming that the maximal and minimal scale is obtained by scanning through all viewing angles for the video, the zoom factor can be defined as the ratio between maximal scale and minimal scale:

Zoom Factor=Maximal Scale/Minimal Scale

Figure 5:
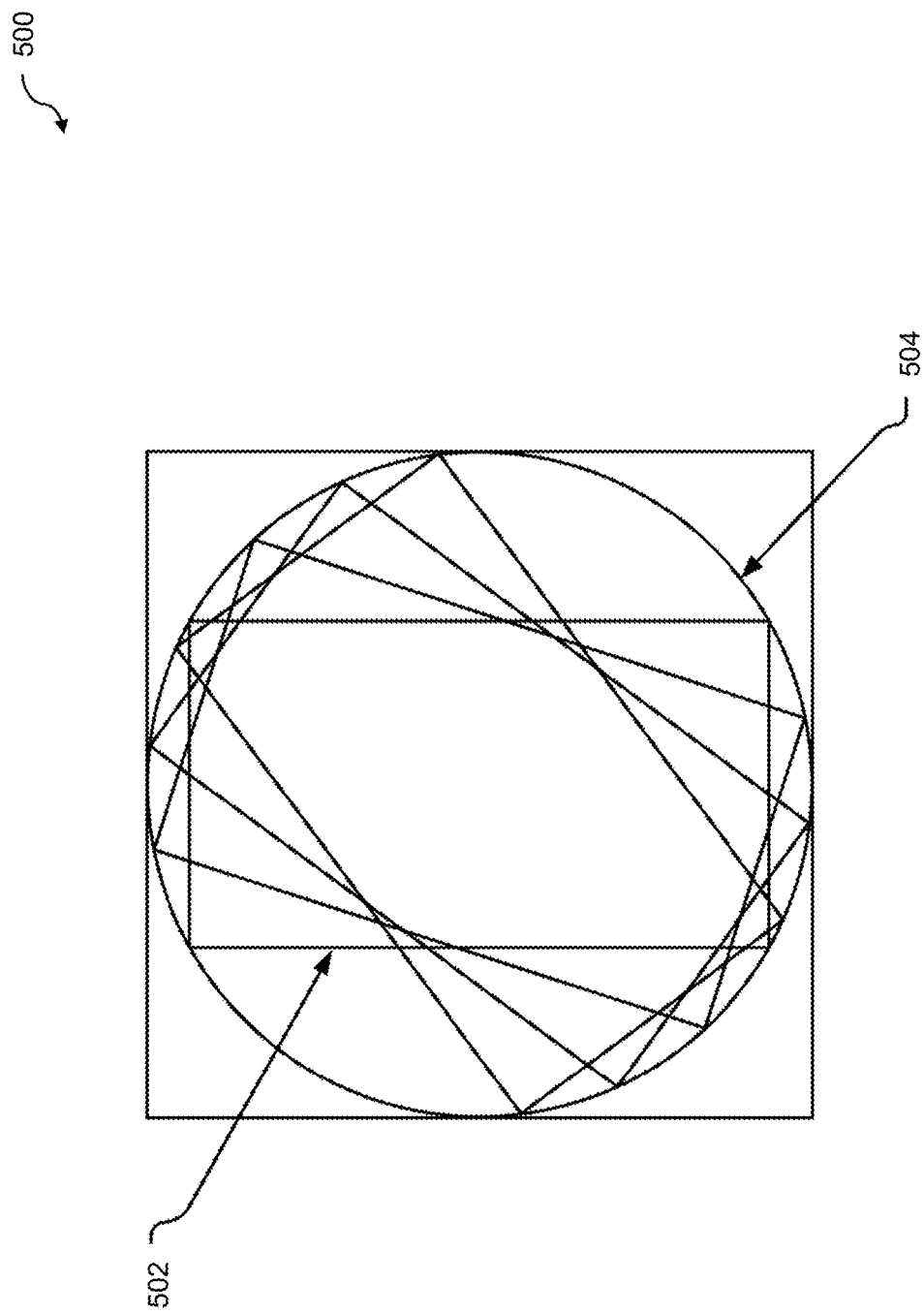
FIG. 5 illustrates an example fixed-orientation video viewing experience by fitting a viewport into an inscribed circle.

FIG. 5 illustrates an example fixed-orientation video viewing experience by fitting a viewport into an inscribed circle. Fitting the viewport into the inscribed circle enables an immersive video experience including rotation. The fixed-orientation video viewing experience 500 is accomplished by fitting a viewport 502 into an inscribed circle 504 using circle-based rotation. Here, a further boundary condition can be considered. Assuming that the video rectangle VO (discussed previously) is a square, an inscribed circle can be created, and the view rectangle VW (discussed previously) can be scaled in order to fit into the circle. That is, VW becomes an inscribed rectangle to the circle. Note that no scaling is necessary when the system rotates the rectangle within a circle, resulting in a fixed scale, and the zoom factor is equal to 1. That is, when a square video is recorded, the fixed-orientation video viewing experience can be easily achieved by fitting the viewport into an inscribed circle. Given a non-square video, the video can be trimmed into a square video. However, significant parts of the video may be cropped out as a result of trimming.

Figure 6:
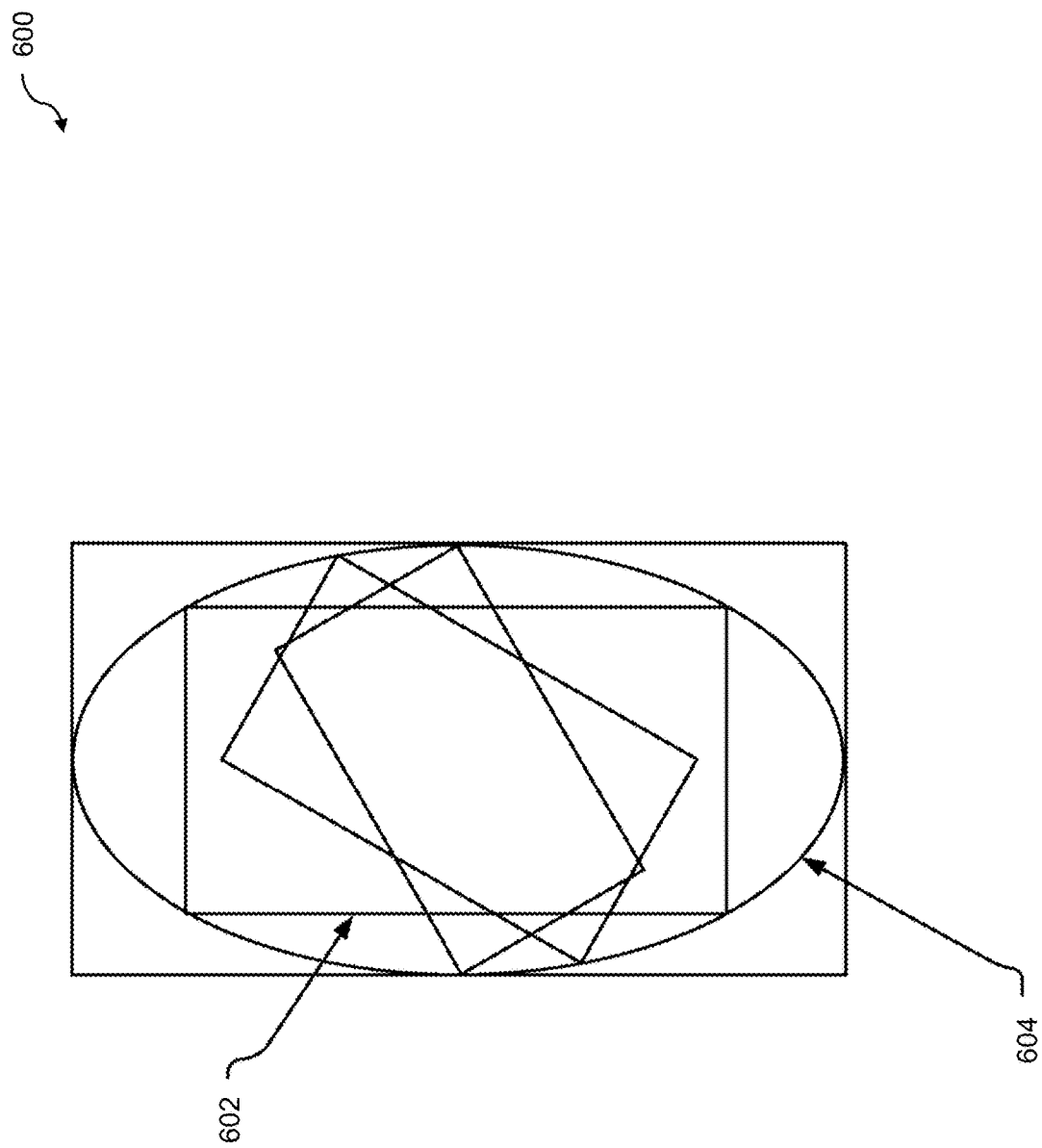
FIG. 6 illustrates an example inscribing of a rectangle-sized video to an oval.

FIG. 6 illustrates an example 600 inscribing of a rectangle sized video 602 to an oval 604. Inscribing the rectangular video into the oval enables an immersive video experience that includes rotation. In this oval-based rotation, instead of cropping the wide side of the rectangle and rotating on the circle, the inscribed oval 604 of the video rectangle VO (discussed previously) can be created. It may no longer be possible to find an inscribed rectangle to the oval at all angles, since not all vertices can stay on the oval. However, the system can still fit the rectangle sized video 602 on the oval 604, which can be inscribed to the oval 604 in vertical or horizontal orientation and can have two vertices on the oval 604 on other angles at most.

Figure 7:
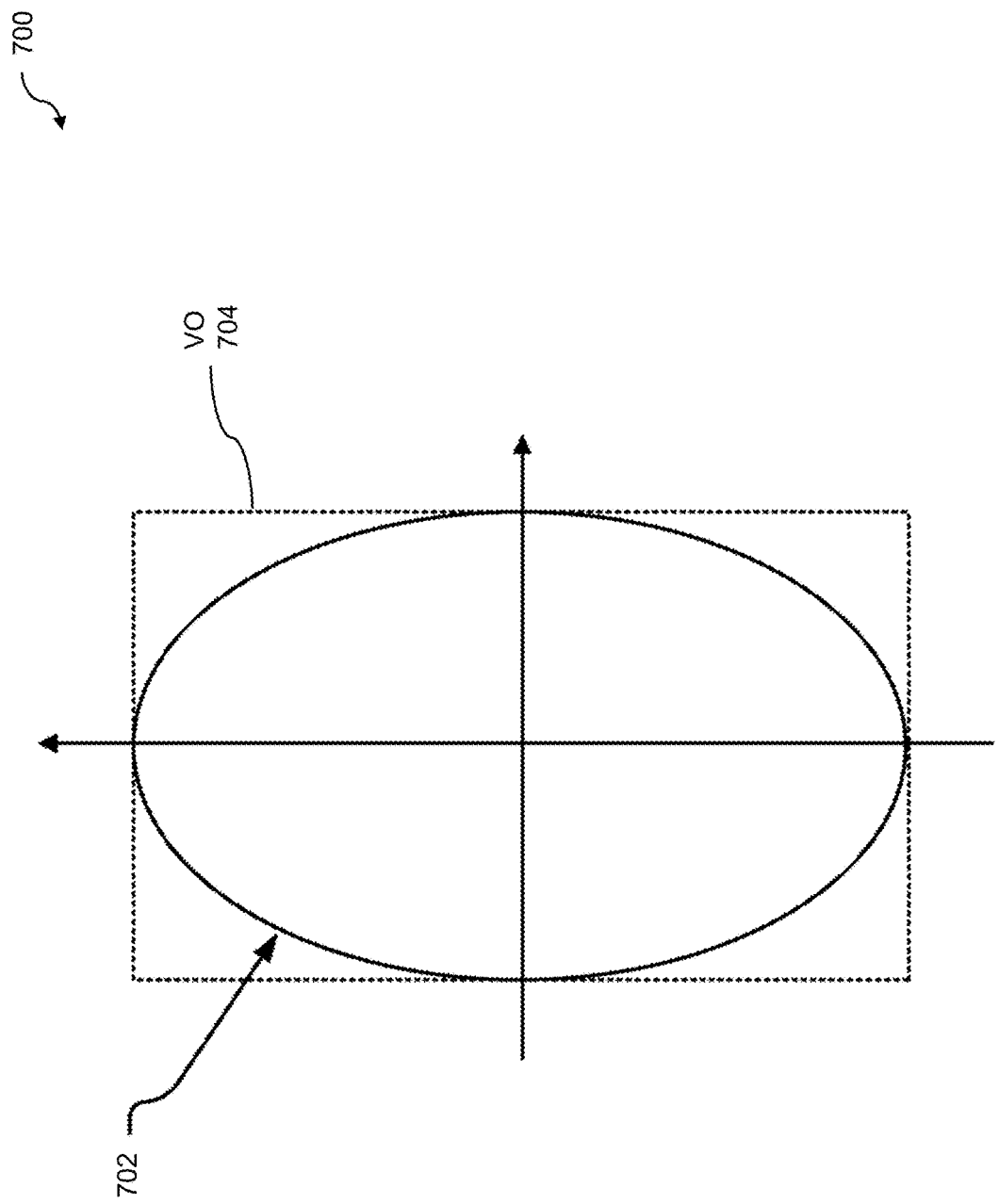
FIG. 7 illustrates an example illustration for fitting a rectangle into an oval.

FIG. 7 illustrates an example illustration for fitting a rectangle into an oval. The fitting a rectangle into an oval enables an immersive video experience including rotation. Alternatively, the playback technology disclosed herein may fit a rectangle video in an oval 702. The playback technology disclosed herein uses an approach described below to find a minimal scale a, given an oval inscribed to video rectangle VO 704 and a view rectangle VW rotated by θ.

(1) An equation of an oval 702, as illustrated in FIG. 7, may be given by:

$$\frac{x^2}{a^2} + \frac{y^2}{b^2} = 1$$

Where $a$=0.5×video width, $b$=0.5×video height.

(2) On the other hand, four vertices of an upright, non-rotated view rectangle VW 600, as illustrated in FIG. 6, may be defined by:

$w$=0.5×view width, $h$=0.5×view height.

Figure 8:
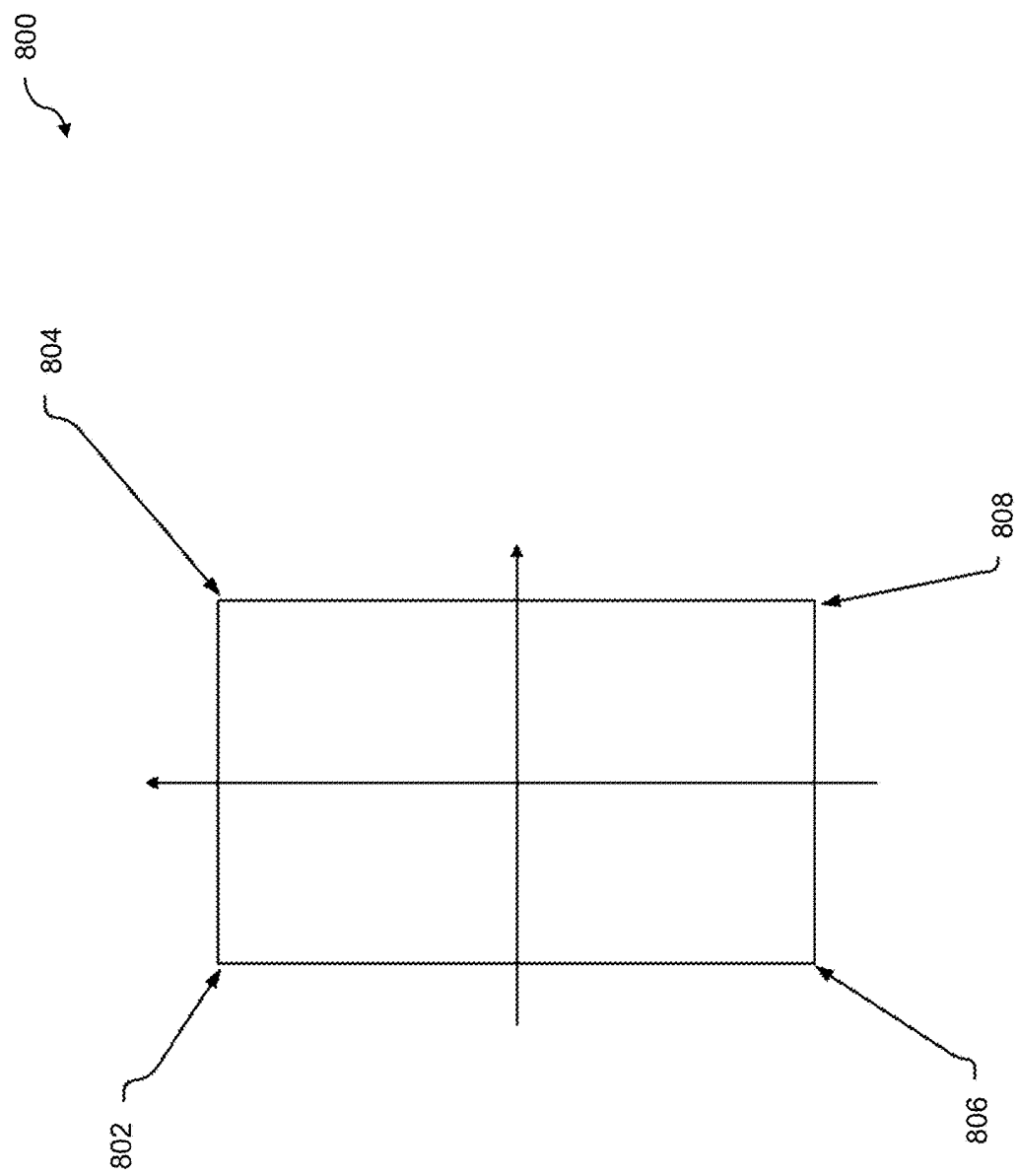
FIG. 8 illustrates an example illustration for calculating position of four vertices of a view rectangle.

(3) FIG. 8 illustrates an example illustration for calculating position of four vertices of a view rectangle. The calculating position of four vertices of a view rectangle enable an immersive video experience including rotation 800. When the view rectangle VW 800 is rotated by theta, the four vertices move to:

Top left vertex 802: (−w cos θ+h sin θ, −w sin θ−h cos θ),
Top right vertex 804: (w cos θ+h sin θ, w sin θ−h cos θ),
Bottom left vertex 806: (−w cos θ−h sin θ, −w sin θ+h cos θ), and
Bottom right vertex 808: (w cos θ−h sin θ, w sin θ+h cos θ).

(4) In order to fit the rotated view rectangle VW in the oval, an implementation scales VW by a and re-applies to (3).

$w'$=0.5α×view width, $h'$=0.5α×view height (5) By combining 1-4, the minimal scale a can be determined given VO, VW, and the rotating angle θ. For instance, if an implementation wants to make sure the top right vertex should stay within the oval, the equation is:

$$\frac{(0.5\alpha \times \text{view width} \times \cos\theta + 0.5\alpha \times \text{view height} \times \sin\theta)^2}{(0.5 \times \text{video width})^2} + \frac{(0.5\alpha \times \text{view width} \times \sin\theta - 0.5\alpha \times \text{view height} \times \cos\theta)^2}{(0.5 \times \text{video height})^2} \leq 1$$

Oval Rotation Method: In an implementation of the video playback technology disclosed herein, the above described geometric framework of designing a rotatable video viewing system is used. The oval gives an alternative mathematical lower bound for the system designer to determine the scaling factor. Based on the Oval Method, the zoom factor is largely reduced. For a typical widescreen portrait video and device of the scale (9:16), the suggested scale is 1.41× at portrait, maxed at 2.04× around 60-degree rotation, and is 1.86× at landscape.

Figure 9:
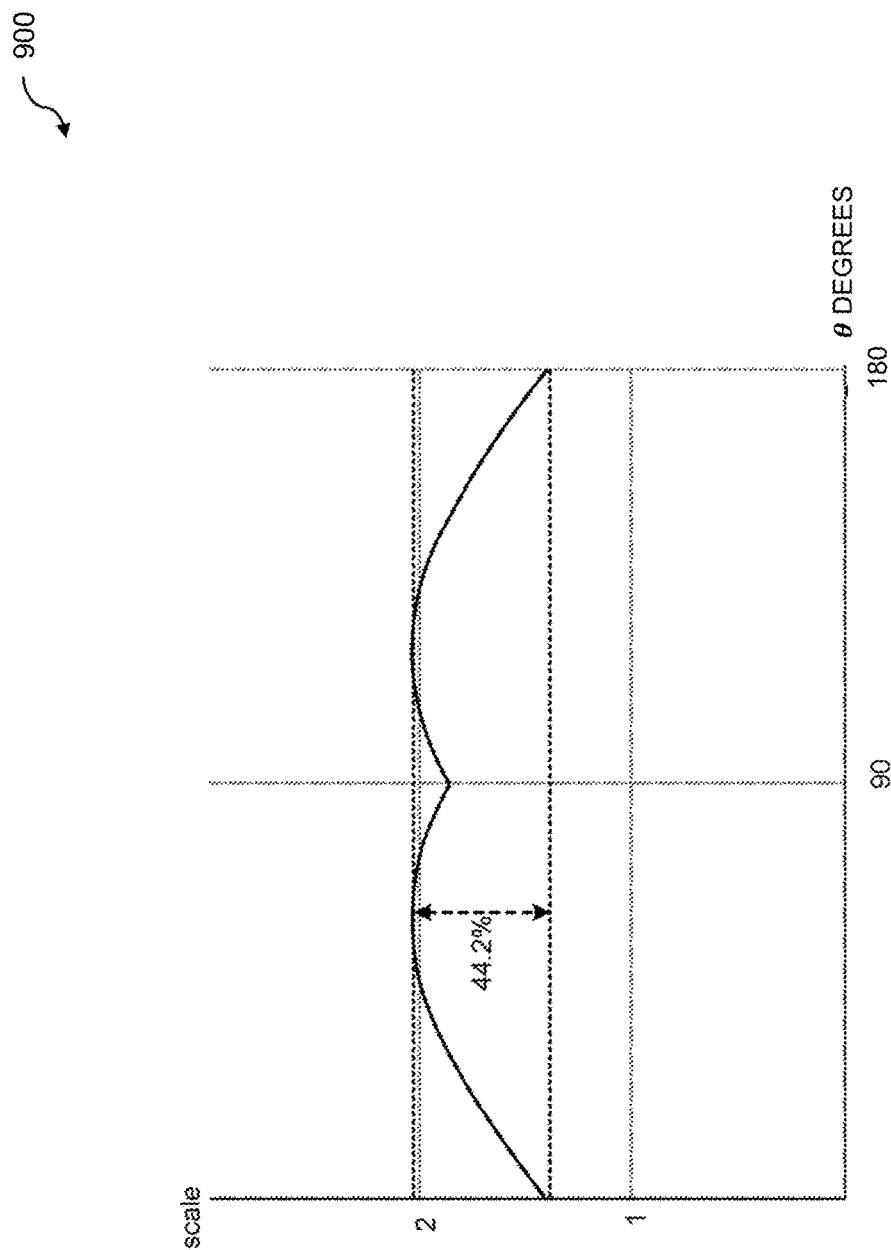
FIG. 9 illustrates an example graph of zoom factor as a function of degree of rotation.

FIG. 9 illustrates an example graph of zoom factor as a function of degree of rotation. The zoom factor as a function of degrees of rotation can be used to enable an immersive video experience including rotation. As a result, the zoom factor is reduced from 77.8% to 44.2%, as illustrated by a graph 900 in FIG. 9. As a result, the user is less likely to feel uncomfortable in viewing the scaled video.

Figure 10:
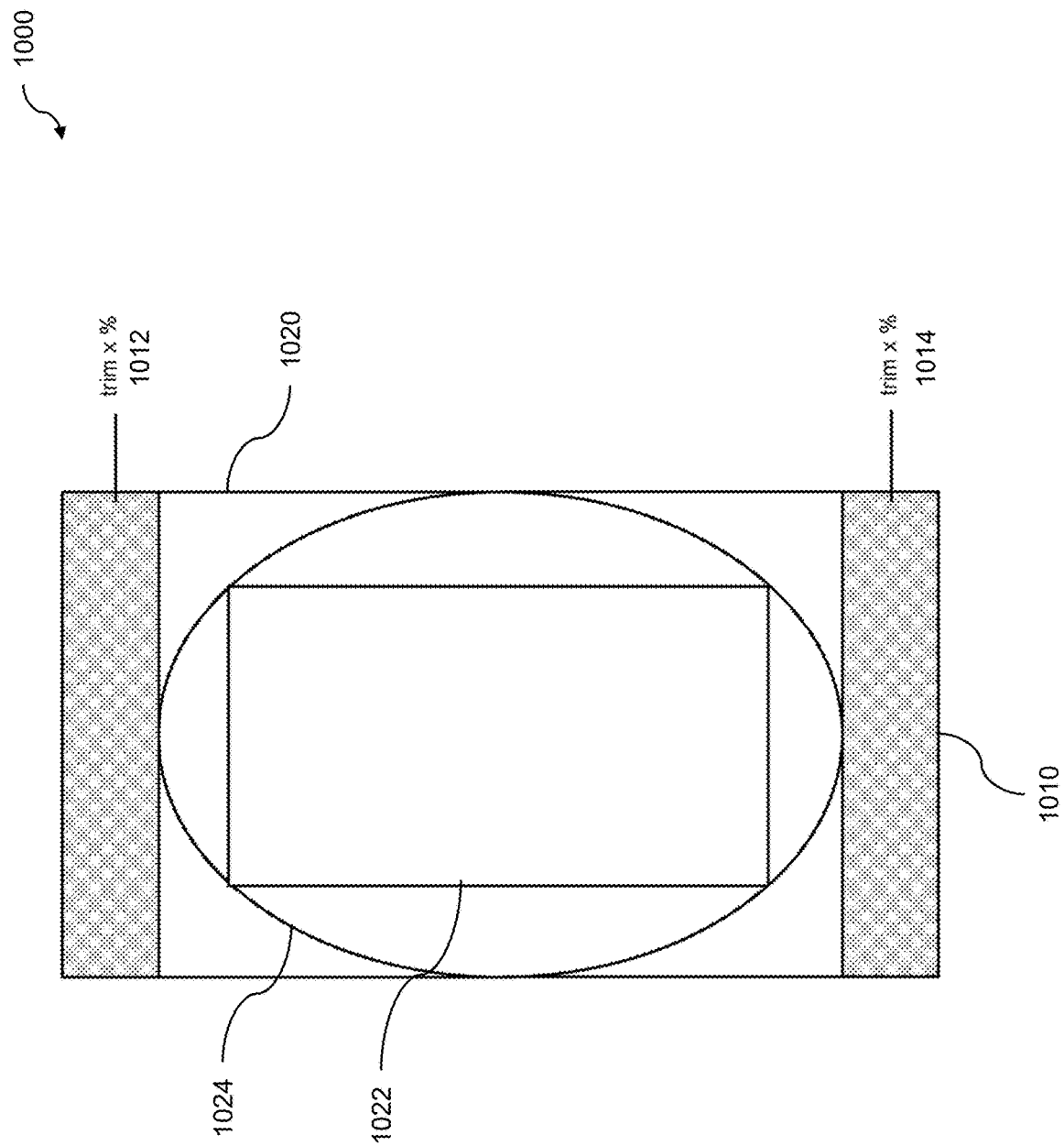
FIG. 10 illustrates example trimming of a wide side of a video according to an implementation disclosed herein.

Given the mathematical lower bound of the scaling factor, an implementation disclosed herein uses an alternative scaling curve as long as it stays in bound. Other enhancements include but are not limited to:

FIG. 10 illustrates example trimming of a wide side of a video according to an implementation disclosed herein.

Trimming the wide side of the video 1000 by x percent, as illustrated by FIG. 10. The trimming of the wide side of the video enables an immersive video experience including rotation. Video parameters and video display parameters are determined, and a minimum scale factor us calculated to inscribe a rectangle within an oval based on the height and width of the video. A video 1010, such as a movie, a TV program, a video game, and so, can include a size, an aspect ratio, a resolution, height and width dimensions, and so on. The dimensions, for example, of the video can be different from the dimensions of a display 1020. In order for the video be viewed on the display, the video, can be scaled, altered, cropped, truncated, and so on. Embodiments can include trimming a wide side of the video by a predetermined percentage. Since the focus of the video, such as action within a game, is generally toward the center of the video, the portions or edges such as the wide side of the video can be trimmed. In the figure, the video is trimmed by a percentage toward one edge 1012 and a minimum scale value can be calculated to inscribe a rectangle within an oval based on a height and a width of the video and wherein a height and a width of the video display define the rectangle trimmed by a percentage toward an opposite or opposing edge 1014. Discussed throughout, a minimum scale value can be calculated to inscribe a rectangle 1022 within an oval 1024 based on a height and a width of the video. By trimming the wide side of the video, a visible area of the video can be maximized within the video display. If the individual viewing the video wants to look left or right within the video, the extended portions as the trimmed portions can be filled in with video image data. The video image data can be generated using techniques including image processing, machine learning, etc.

Figure 11:
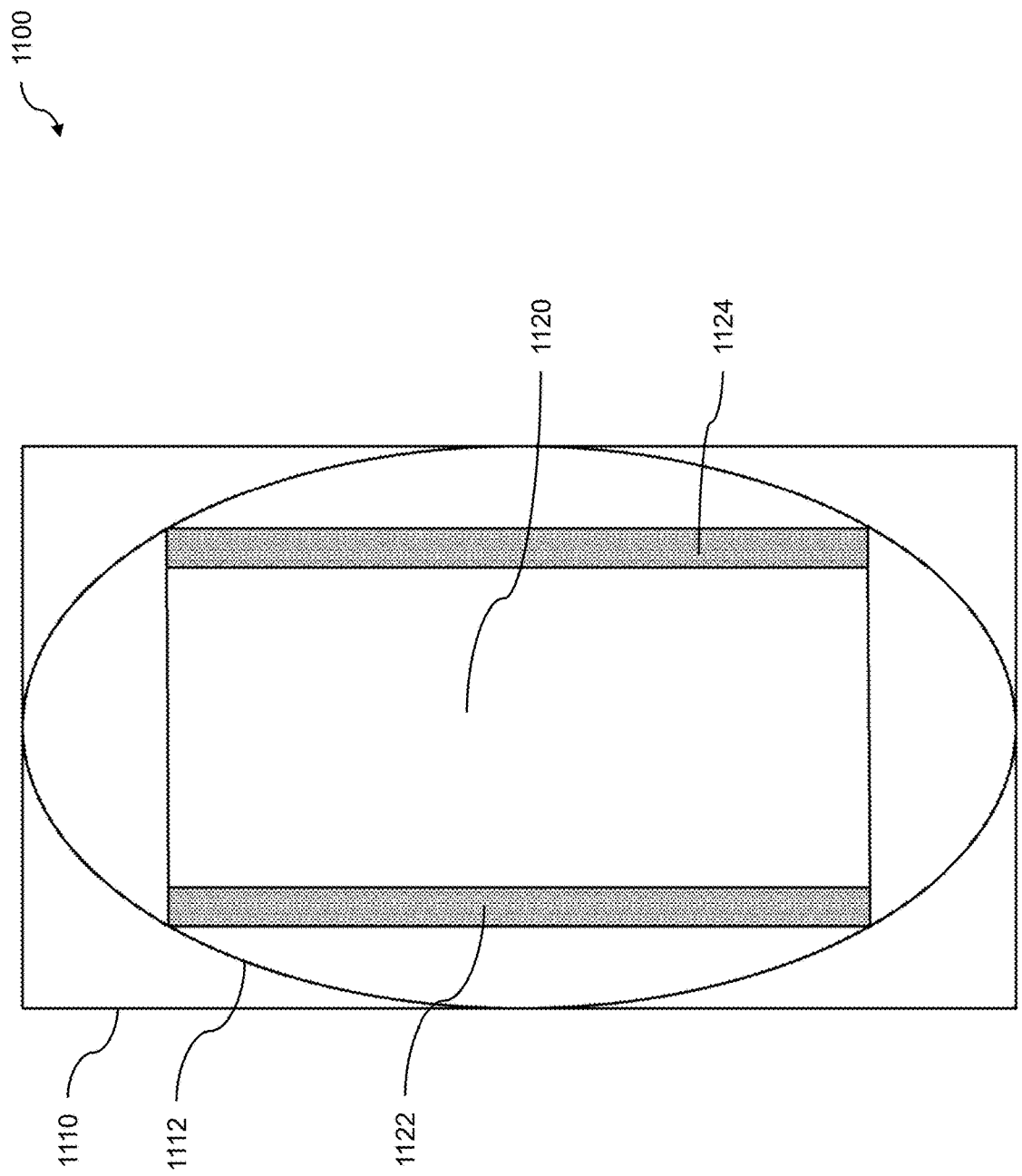
FIG. 11 illustrates example pre-zooming and maintaining at a fixed scale with view-around portrait orientation according to an implementation disclosed herein.

FIG. 11 illustrates example pre-zooming and maintaining at a fixed scale with view-around portrait orientation 1100, according to an implementation disclosed herein. A video can be pre-zoomed and the fixed scale of the video can be maintained to support an immersive video experience including rotation. A video such as a movie or video game can be displayed on a display 1110. The display can include associated parameters such as resolution, dimensions, aspect ratio, and so on, where the parameters of the display are substantially similar to or substantially different from parameters associated with the video. The oval 1112 can be based on the video or a scaled version of the video and can be chosen to maximize a visible area of the video. The video can include a height and a width, an aspect ratio, etc., that are not proportional to the display. That is, the video cannot simply be scaled to fit within the oval on the display. In embodiments, the video can be pre-zoomed 1120. The pre-zooming of the video can be maintained throughout viewing of the video by the user. When the aspect ratio of the video is different from the aspect ratio of the display, the video can be masked using masks, such as masks 1122 and 1124.

Figure 12:
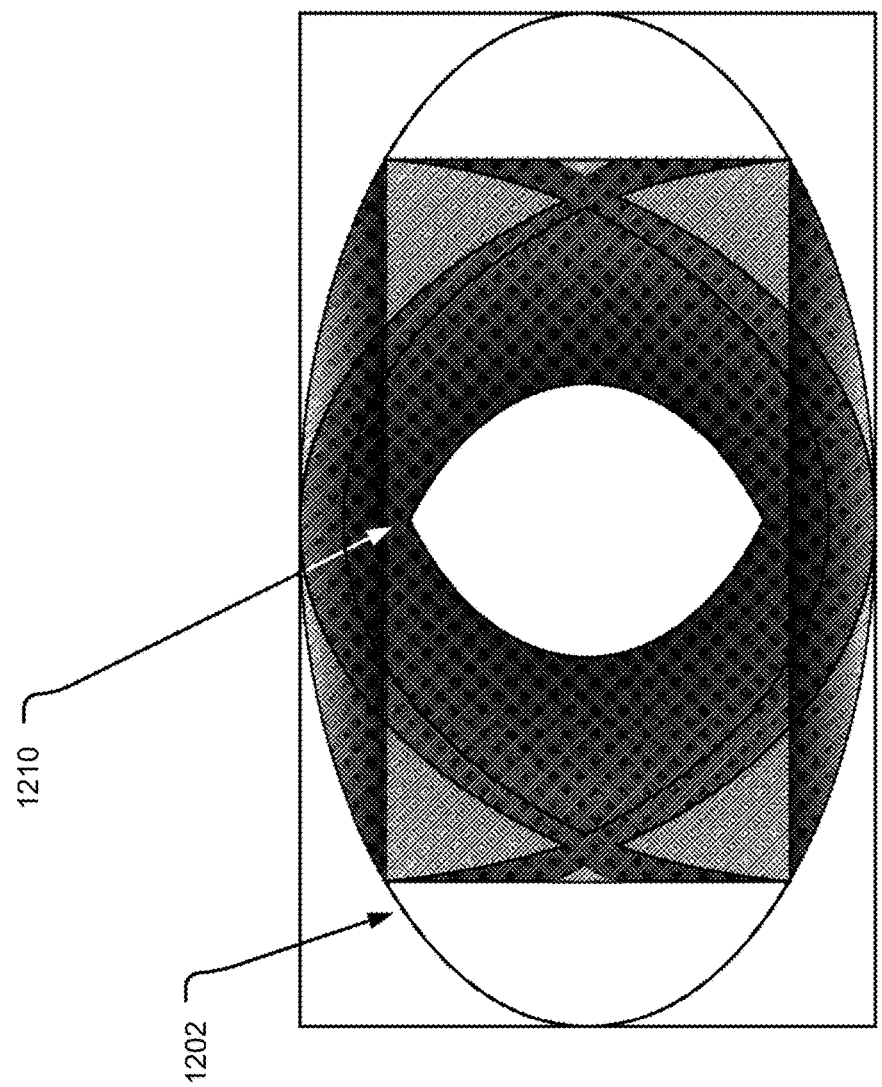
FIG. 12 illustrates example overlaying of rotated view angles according to an implementation disclosed herein.

FIG. 12 illustrates example overlaying of rotated view angles according to an implementation disclosed herein. Alternatively, the system overlays the rotated view rectangles 1210 in an oval 1202 as illustrated in FIG. 12 to obtain a visible video mask 1200. The mask 1200 may be used as a visual hint for users who record videos, and/or for video compression purposes. For example, the visible video mask 1200 may be communicated to a user so that the user can view a boundary of the visible video mask 1200 when recording a video. For example, the visible video mask 1200 may be overlaid on a device screen when a user is recording a video.

Figure 13:
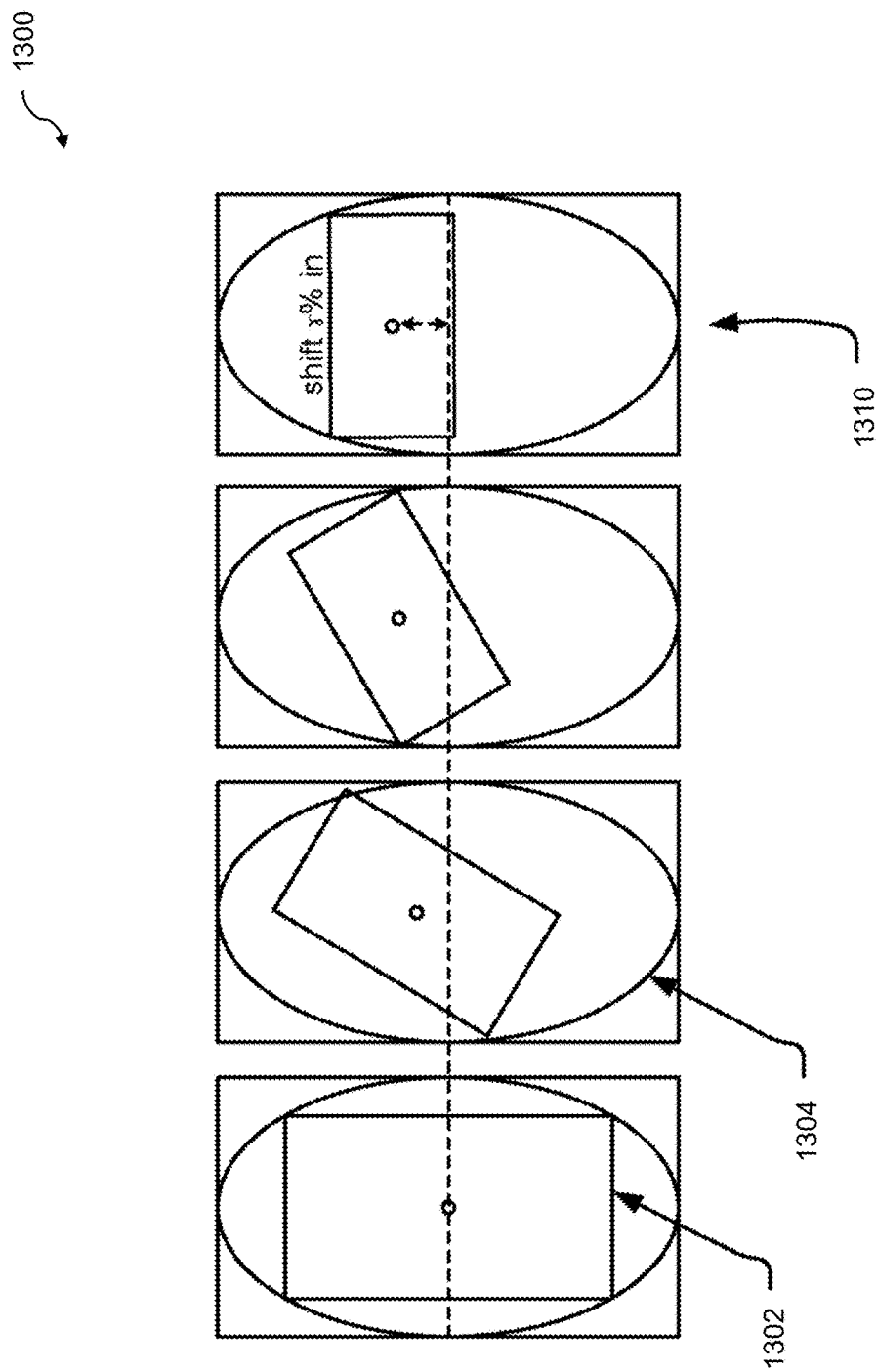
FIG. 13 illustrates example rotation of a video off a center of an oval.

FIG. 13 illustrates example rotation of a video off a center of an oval. Yet alternatively, the system rotates the video 1302 off a center of an oval 1304 as disclosed by 1300 in FIG. 13. For instance, the viewport can be centered at portrait, while shifting upward or downward at landscape as illustrated at 1310. The technique is particularly useful to capture the highlight of the video.

In another implementation, to support off-center rotation, a "Highlight Anchor" can be positioned on the video. In one implementation, the video playback technology disclosed herein allows a user to set the anchor. In another implementation, the video playback technology disclosed herein sets the anchor automatically (by a computer-vision enabled system).

Figure 14:
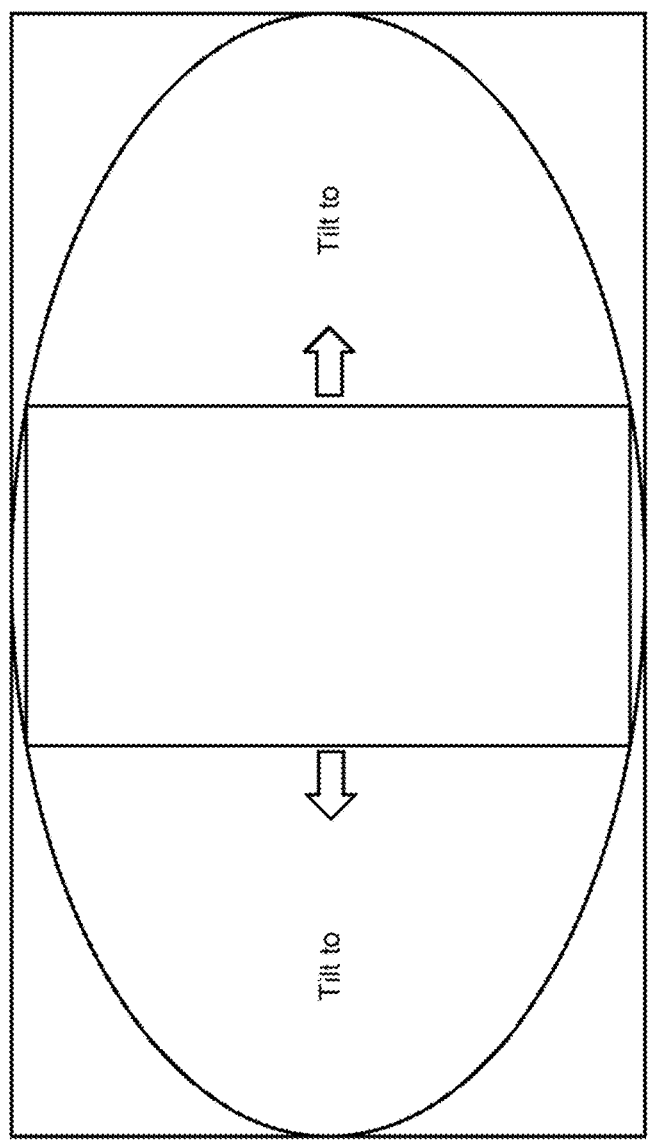
FIG. 14 illustrates example movement of viewport that allows a user to tilt or move the viewing device.

FIG. 14 illustrates example movement of a viewport that allows a user to tilt or move the viewing device. As the viewport is scaled up (zoomed in) for viewing the video in order to support rotation, viewable margins can exist in one or multiple directions. Therefore, in one implementation, the system allows the user to tilt or move the viewing device to the left, right, up, and down. In such an implementation, the system moves the viewport accordingly as illustrated by 1400 in FIG. 14. Here "tilt" is defined as relative motion, whereas "move" is defined as absolute motion. In another implementation, the rotation, movement, and tilting are allowed only after a time set by the video creators.

The video display technology disclosed herein creates a unique video viewing experience in which the user cannot view the entire video in one angle. As a result, the user is motivated to engage in the experience by chasing a moving subject in the video. In one implementation, as only a partial view is visible in the initial view angle, the user is motivated to rotate the viewing device in order to reveal the whole scene within the video.

Furthermore, the video display technology disclosed herein allows a unique storytelling experience for a video creator, who can compose the space and time of the video in various ways to engage the viewers to interact with the video. The engaging viewing experience also represents extensive opportunities for more effective mobile video advertising.

Video Sharing

Figure 15:
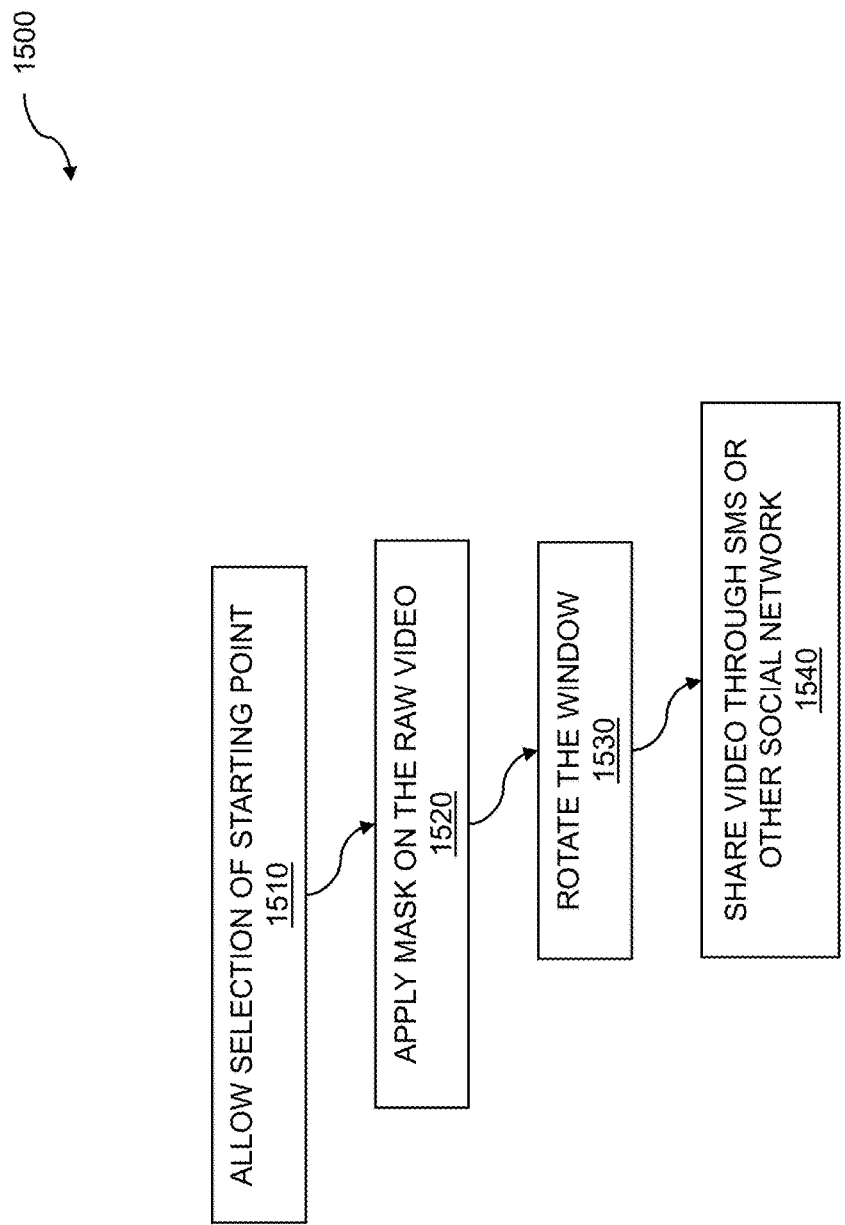
FIG. 15 illustrates example operations of a system for providing an immersive video experience in a manner disclosed herein.

FIG. 15 illustrates example operations of a system for providing an immersive video experience in a manner disclosed herein. While the rotating video browsing experience relies on the core algorithm within the specific software, in order for people using a general video browsing software to enjoy a partial experience, the technology disclosed herein provides a special version of the raw video, which can be shared with other people and other software universally. One or more operations 1500 for sharing the video are illustrated in FIG. 15. An operation 1510 allows announcing to one or more friends who want to share the video experience (sharer) to select where they want the rotation to start in the shared version of the video. An operation 1520 applies a mask on the raw video, with a rectangle-shaped window, so that the receiver can view just part of the video, as if using special software to browse the video vertically. Subsequently, depending on the user's selection in operation 1510, at ¼, or ⅔, or ¾ of the video timeline, an operation 1530 rotates the window in operation 1520 clockwise, as if the receiver can rotate the device and see different parts of the video. Finally, an operation 1540 allows the sharer to distribute the video through short message service (SMS) or other social networks.

Avoiding Rotation when Device in on a Horizontal Surface

When the device is laid flat on the desk, the gravity's direction is perpendicular to the screen, and its projection onto the screen's X and Y axes is very small. Since the core algorithm relies on the X and Y axis readings as input, the input has a very low signal-to-noise ratio (SNR), and a small disturbance to the device may cause the video to rotate significantly, resulting in a negative user experience. To avoid this, an implementation disclosed herein avoids any operation if the X and Y axis readings are below predetermined thresholds X_THRESHOLD and Y_THRESHOLD. The pseudocode for such implementation is as given below:

```
if (gravity.x < X_THRESHOLD && gravity.y < Y_THRESHOLD) {
  return;
} else {
  performCoreAlgorithm( );
}
```

Smooth Out Rotation Using a Low-Pass Filter (LPF)

The core algorithm may react very swiftly to a device's altitude change against the gravity. When watched for a long time, a user may feel it hyper-responsive and get motion sick. An implementation disclosed herein reduces the motion sickness by avoiding responding to small turbulence in the altitude change. In such an implementation, whenever the software receives an update from the device's gravity sensor, it applies a low-pass filter (LPF) and uses the LPF output as the input to the core algorithm. The pseudocode for such implementation is as given below:

```
var lpfX = 0.0;
var lpfY = 0.0;
let kFilteringFactor = 0.1;
func onDeviceGravityUpdate(gravity) {
    let lpfX = (gravity.x * kFilteringFactor) + (lpfX * (1.0 - kFilteringFactor))
    let lpfY = (gravity.y * kFilteringFactor) + (lpfY * (1.0 - kFilteringFactor))
}
```

Figure 16:
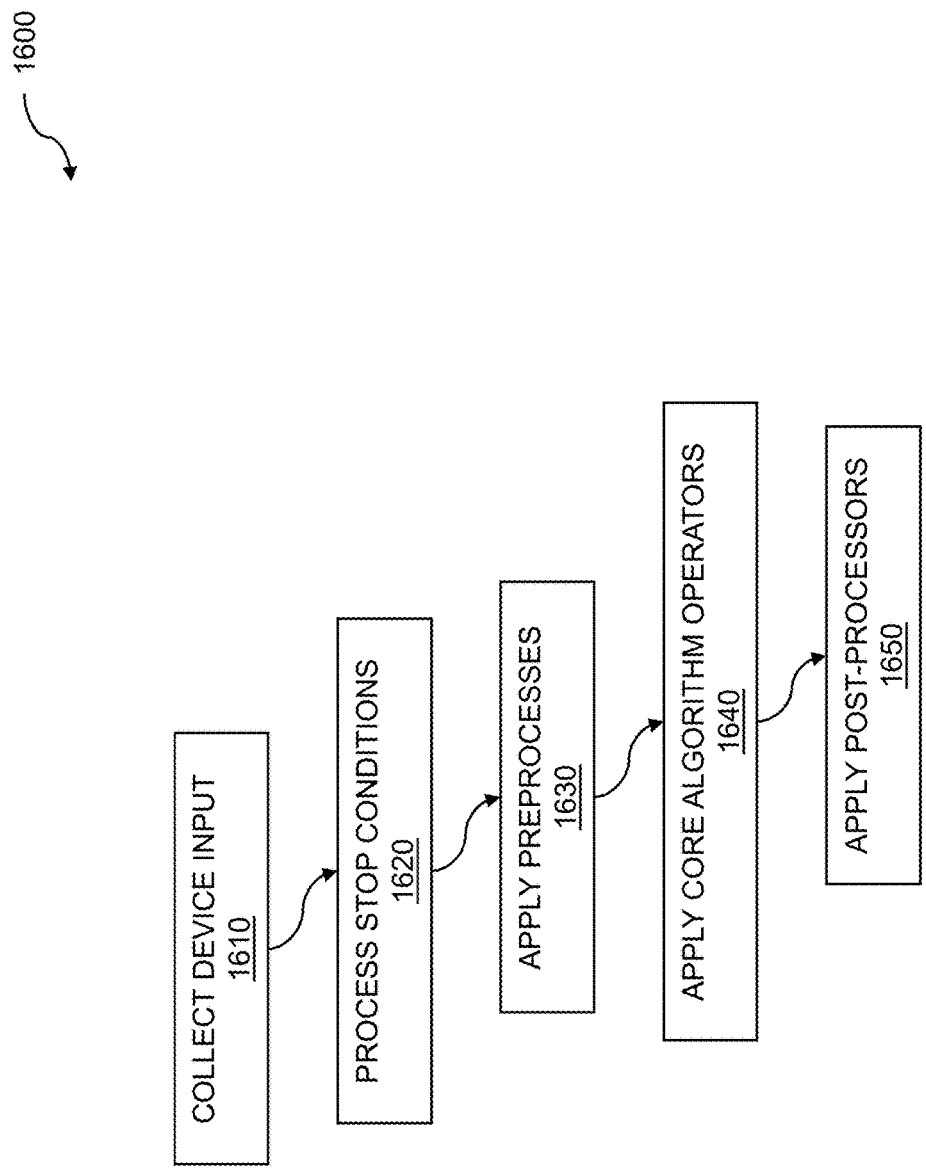
FIG. 16 illustrates alternative example operations of a system for providing an immersive video experience in a manner disclosed herein.

FIG. 16 illustrates alternative example operations 1600 of a system for providing an immersive video experience. An overview of the video playback system is disclosed herein. An operation 1610 collects various device inputs. An operation 1620 processes one or more stop conditions if the device is laid on a horizontal surface. An operation 1630 applies one or more preprocesses including a low-pass filter, a video inset, a viewport inset, etc. An operation 1640 applies various core algorithm operations discussed herein. Subsequently, an operation 1650 applies one or more post-processing operations to smooth the scale of video playback.

Figure 17:
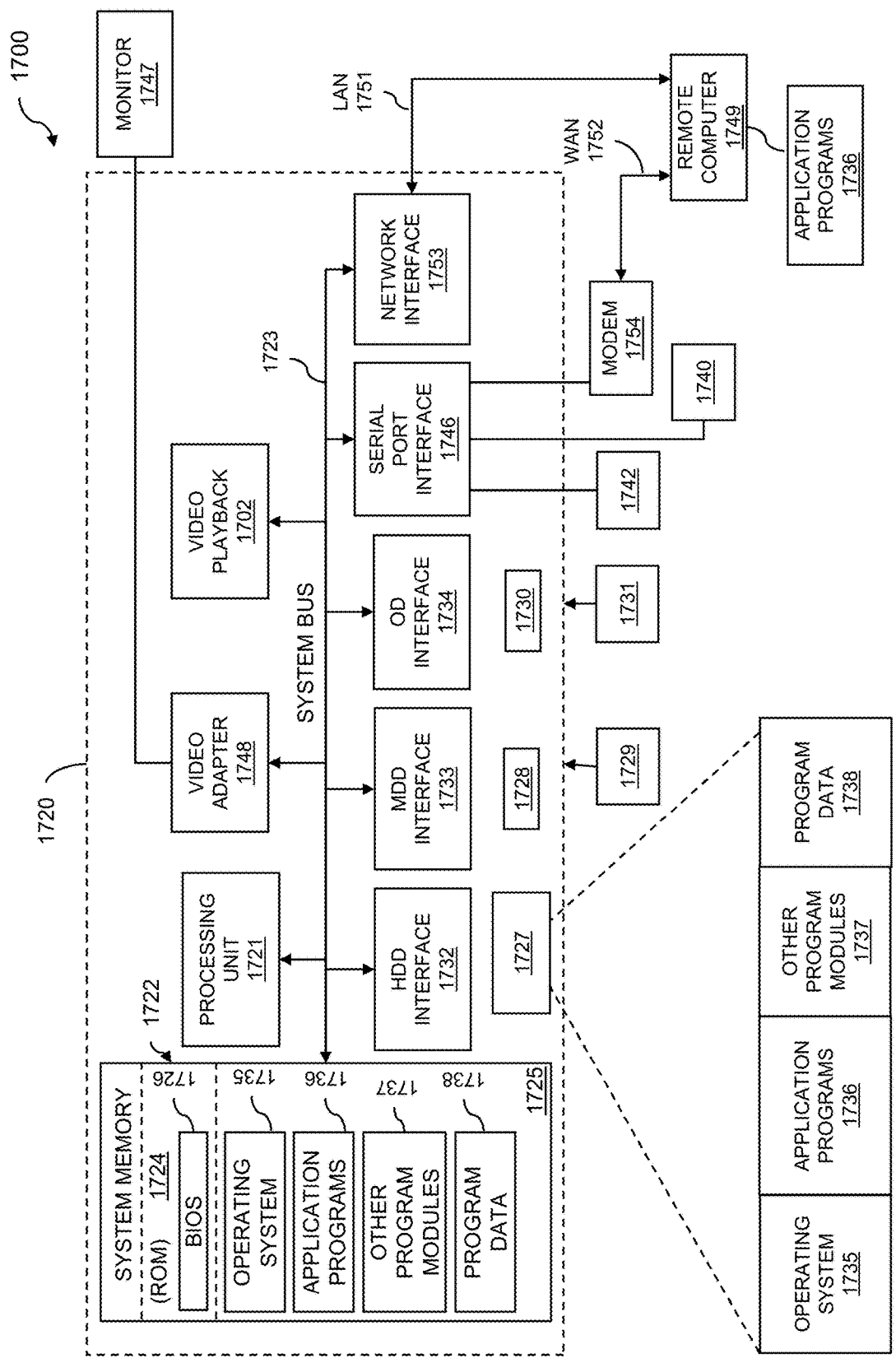
FIG. 17 illustrates an example computing system that may be used to implement the system disclosed herein.

FIG. 17 illustrates an example computing system 1700 that may be useful in implementing the described predictive analytics technology. The example hardware and operating environment of FIG. 17 for implementing the described technology includes a computing device, such as a general purpose computing device in the form of a gaming console or computer 1720, a mobile telephone, a personal data assistant (PDA), a set top box, or other type of computing device. In the implementation of FIG. 17, for example, the computer 1720 includes a processing unit 1721, a system memory 1722, and a system bus 1723 that operatively couples various system components including the system memory to the processing unit 1721. There may be only one or there may be more than one processing unit 1721, such that the processor of computer 1720 comprises a single central processing unit (CPU), or a plurality of processing units, commonly referred to as a parallel processing environment. The computer 1720 may be a conventional computer, a distributed computer, or any other type of computer; the implementations are not so limited.

The system bus 1723 may be any of several types of bus structures including a memory bus or memory controller, a peripheral bus, a switched fabric, point-to-point connections, and a local bus using any of a variety of bus architectures. The system memory may also be referred to simply as the memory and includes read only memory (ROM) 1724 and random-access memory (RAM) 1725. A basic input/output system (BIOS) 1726, containing the basic routines that help to transfer information between elements within the computer 1720, such as during start-up, is stored in ROM 1724. The computer 1720 further includes a hard disk drive 1727 for reading from and writing to a hard disk (not shown), a magnetic disk drive 1728 for reading from or writing to a removable magnetic disk 1729, and an optical disk drive 1730 for reading from or writing to a removable optical disk 1731 such as a CD ROM, DVD, or other optical media.

The hard disk drive 1727, magnetic disk drive 1728, and optical disk drive 1730 are connected to the system bus 1723 by a hard disk drive interface 1732, a magnetic disk drive interface 1733, and an optical disk drive interface 1734, respectively. The drives and their associated tangible computer-readable media provide nonvolatile storage of computer-readable instructions, data structures, program modules, and other data for the computer 1720. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the video playback system 1702 as disclosed herein may be implemented in one of the memories of the computer 1720.

A number of program modules may be stored on the hard disk, magnetic disk 1729, optical disk 1731, ROM 1724, or RAM 1725, including an operating system 1735, one or more application programs 1736, other program modules 1737, and program data 1738. A user may enter commands and information into the personal computer 1720 through input devices such as a keyboard 1740 and pointing device 1742. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 1721 through a serial port interface 1746 that is coupled to the system bus, but may be connected by other interfaces, such as a parallel port, game port, or a universal serial bus (USB). A monitor 1747 or other type of display device is also connected to the system bus 1723 via an interface, such as a video adapter 1748. In addition to the monitor, computers typically include other peripheral output devices (not shown), such as speakers and printers.

The computer 1720 may operate in a networked environment using logical connections to one or more remote computers, such as remote computer 1749. These logical connections are achieved by a communication device coupled to or a part of the computer 1720; the implementations are not limited to a particular type of communications device. The remote computer 1749 may be another computer, a server, a router, a network PC, a client, a peer device or other common network node, and typically includes many or all of the elements described above relative to the computer 1720, although only a memory storage device has been illustrated in FIG. 17. The logical connections depicted in FIG. 17 include a local-area network (LAN) 1751 and a wide-area network (WAN) 1752. Such networking environments are commonplace in office networks, enterprise-wide computer networks, intranets and the Internet, which are all types of networks.

When used in a LAN-networking environment, the computer 1720 is connected to the local network 1751 through a network interface or adapter 1753, which is one type of communications device. When used in a WAN-networking environment, the computer 1720 typically includes a modem 1754, a network adapter, a type of communications device, or any other type of communications device for establishing communications over the wide area network 1752. The modem 1754, which may be internal or external, is connected to the system bus 1723 via the serial port interface 1746. In a networked environment, program engines depicted relative to the personal computer 1720, or portions thereof, may be stored in the remote memory storage device. It is appreciated that the network connections shown are examples and other means of and communications devices for establishing a communications link between the computers may be used.

In an example implementation, software or firmware instructions and data for providing a search management system, various applications, search context pipelines, search services, a service, a local file index, a local or remote application content index, a provider API, a contextual application launcher, and other instructions and data may be stored in memory 1722 and/or storage devices 1729 or 1731 and processed by the processing unit 1721.

Figure 18:
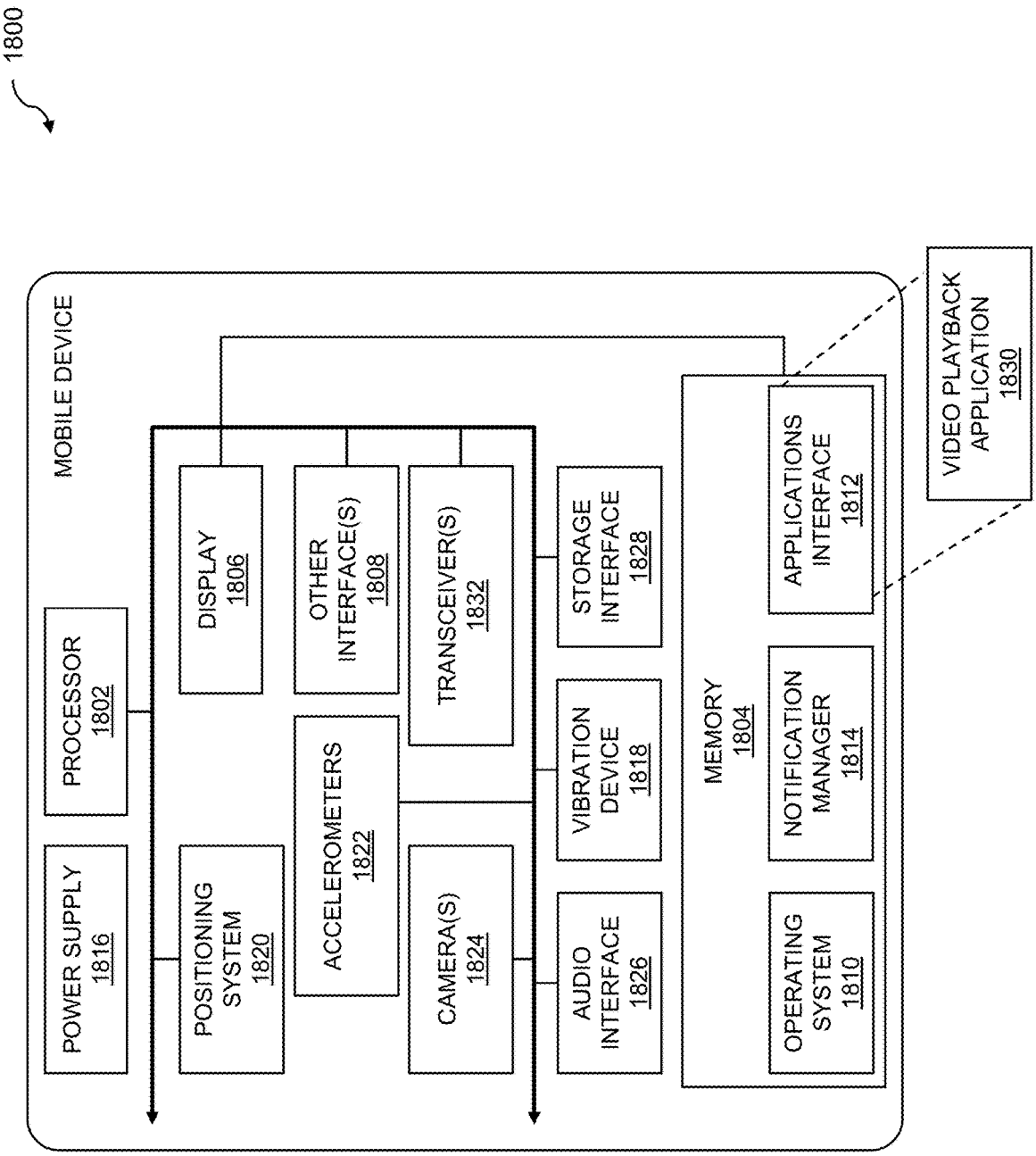
FIG. 18 illustrates an example mobile device that may be used to implement the system disclosed herein.

FIG. 18 illustrates an example mobile device that may be used to implement the system disclosed herein. Another example system (labeled as a mobile device 1800) that may be useful in implementing the described technology. The mobile device 1800 includes a processor 1802, a memory 1804, a display 1806 (e.g., a touchscreen display), and other interfaces 1808 (e.g., a keyboard). The memory 1804 generally includes both volatile memory (e.g., RAM) and non-volatile memory (e.g., flash memory). An operating system 1810, such as the Microsoft Windows® Phone operating system, resides in the memory 1804 and is executed by the processor 1802, although it should be understood that other operating systems may be employed.

One or more application programs modules 1812 are loaded in the memory 1804 and executed on the operating system 1810 by the processor 1802. Examples of applications 1812 include, without limitation, email programs, scheduling programs, personal information managers, Internet browsing programs, multimedia player applications, etc. In one implementation, an immersive video playback application 1830 may be implemented on the application programs module 1812. A notification manager 1814 is also loaded in the memory 1804 and is executed by the processor 1802 to present notifications to the user. For example, when a promotion can be triggered and presented to a shopper, the notification manager 1814 can cause the mobile device 1800 to beep or vibrate (via the vibration device 1818) and display the promotion on the display 1806.

The mobile device 1800 includes a power supply 1816, which is powered by one or more batteries or other power sources and which provides power to other components of the mobile device 1800. The power supply 1816 may also be connected to an external power source that overrides or recharges the built-in batteries or other power sources.

The mobile device 1800 includes one or more communication transceivers 1832 to provide network connectivity (e.g., mobile phone network, Wi-Fi®, Bluetooth®, etc.). The mobile device 1800 also includes various other components, such as a positioning system 1820 (e.g., a global positioning satellite transceiver), one or more accelerometers 1822, one or more cameras 1824, an audio interface 1826 (e.g., a microphone, an audio amplifier and speaker and/or audio jack), and additional storage 1828. Other configurations may also be employed.

In an example implementation, a mobile operating system, various applications, and other modules and services may be embodied by instructions stored in memory 1804 and/or storage devices 1828 and processed by the processing unit 1802. User preferences, service options, and other data may be stored in memory 1804 and/or storage devices 1828 as persistent datastores.

Figure 19:
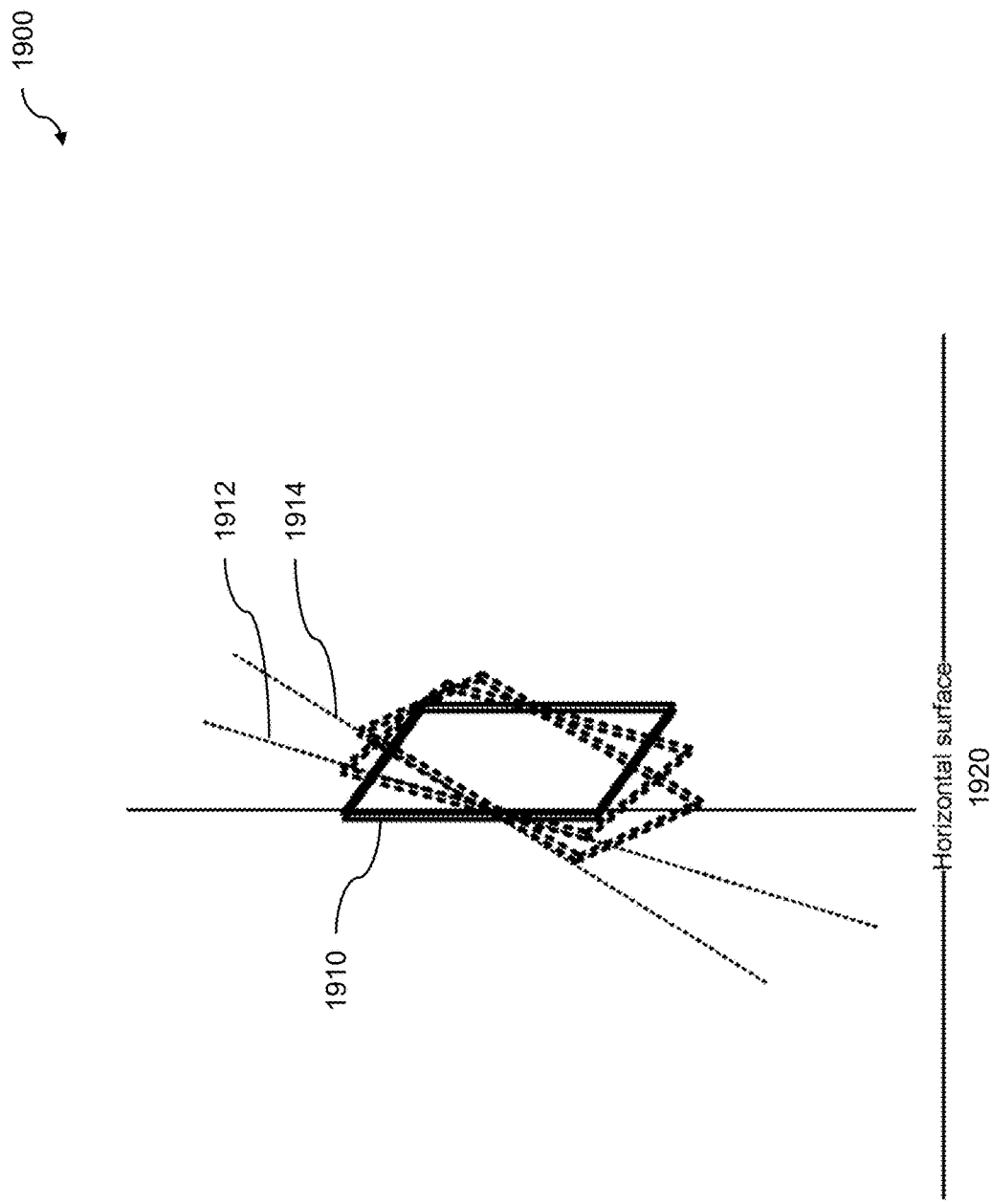
FIG. 19 illustrates an example move of a display device.

FIG. 19 illustrates an example move 1900 of a display device. A display device, such as a display coupled to a personal electronic device including a smartphone, tablet, or PDA, etc., can be used by an individual to display a video. The video that is displayed can include a movie, a video game, etc. The display can be rotated as the individual views the video. Rotation of the display is used for an immersive video experience. A display 1910 can be in an initial orientation such as vertical with respect to a horizontal surface 1920. As the individual views video, the user can rotate the display to varying amounts of rotation. Two rotations are shown, a first rotation 1912 and a second rotation 1914. The rotation of the display can enable the individual to view extended portions of the video, such as extended portions up, down, left, right, etc. The display can also be rotated within a plane. The rotation within a plane can include a clockwise rotation, a counterclockwise rotation, etc. The rotation within a plane can further enhance the immersive video experience by changing a viewport into the video.

Figure 20:
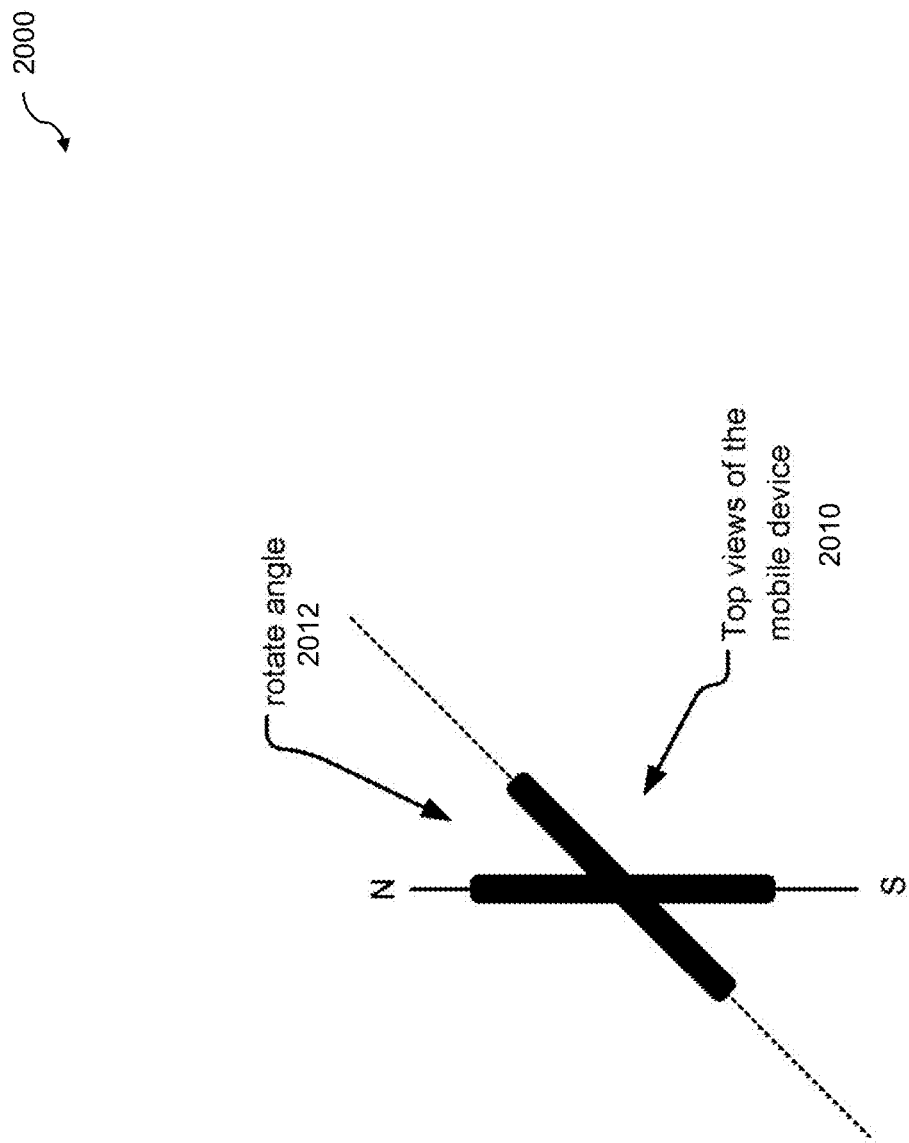
FIG. 20 illustrates an example rotation of a display device.

FIG. 20 illustrates an example rotation 2000 of a display device. Discussed throughout, an individual can view a movie, TV program, video game, or other video content using a display coupled to an electronic device such as a smartphone, tablet, game console, laptop computer, etc. As the individual views the video, that individual can rotate the display. The rotation of the display can change a viewport provided to the individual into the video. Rotation of the display device enhances an immersive video experience. An electronic device 2010 can be viewed from the top. While rotation of the electronic device has been described above for forward and back rotation (pitch) and rotation within a plane (roll), the device can further be rotated with respect to the top view of the device (yaw). This latter rotation can enable different viewing angles and can further enable in-video actions such as looking left or looking right. Such viewing of the video can include viewing extended portions of the video. The extended portions of the video can be filled with generated video data, where the generated video data can be generated using techniques including image processing techniques, machine learning techniques, and the like.

FIG. 21 illustrates example operations of a system 2100 for providing an immersive video experience in a manner disclosed herein. An operation 2110 determines various parameters of a video, including a size of the video, a size of a viewport used to display the video, an angle of the viewport, a scale factor, etc. An operation 2120 determines various device inputs, such as an input from an accelerometer, an input from a gyroscope, etc. An operation 2130 determines one or more boundary conditions, such as viewport of the user, a zoom factor, etc. An operation 2140 determines a minimum value of a scale to inscribe a rectangle in an oval. An operation 2150 processes one or more stop conditions disclosed herein. For example, one stop condition may be that if the device displaying the video is put on a substantially horizontal surface as indicated by a device input, the processing of the video as disclosed herein is stopped.

An operation 2160 preprocesses the view according to one or more preprocessing methods disclosed herein. An example preprocessor may be processing the video using a low-pass filter. Another preprocessing operation may include one of a video inset and/or a viewport inset before a core algorithm disclosed herein is applied. An operation 2170 smooths the scale of the rectangle according to one or more scaling methods disclosed herein. An operation 2180 may display the video in the rectangle.

Figure 22A:
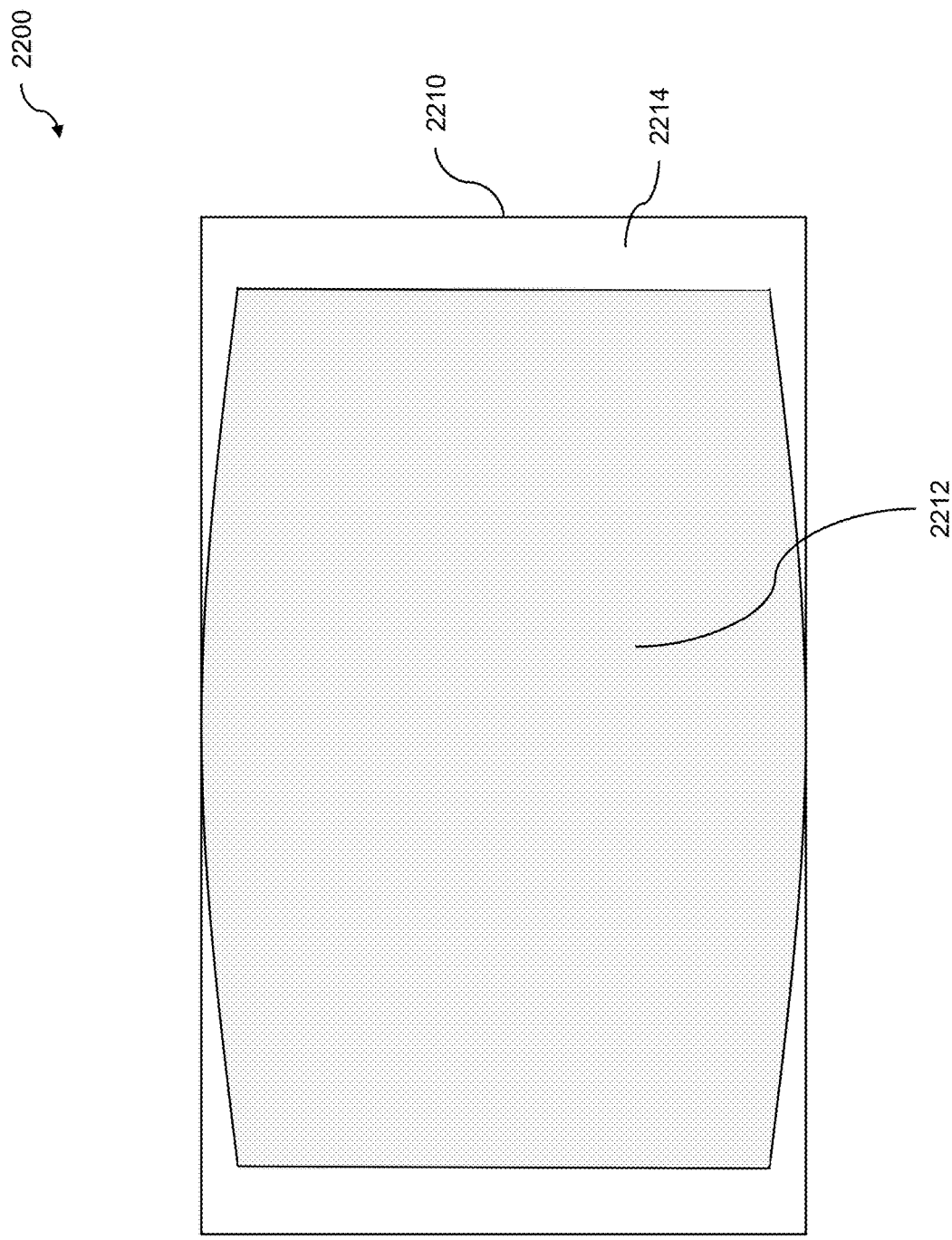
FIG. 22A illustrates the original video on a device viewport.

FIG. 22A illustrates original video on a device viewport. An implementation of the system is disclosed wherein as the viewport of a device is rotated, the video shown in the viewport is expanded in order to maximize the visible area of original video. In other words, the system proposes a technique for reducing invisible areas of the video while performing rotation of the viewport. Specifically, as shown at 2200, the original video is 2210 and the visible area on a viewport is 2212. Since 2212 is smaller than the original video in 2210, only part of the video is shown on the viewport, thus resulting in lost regions 2214 of the video that would not be seen on the viewport at any rotate angle.

Figure 22B:
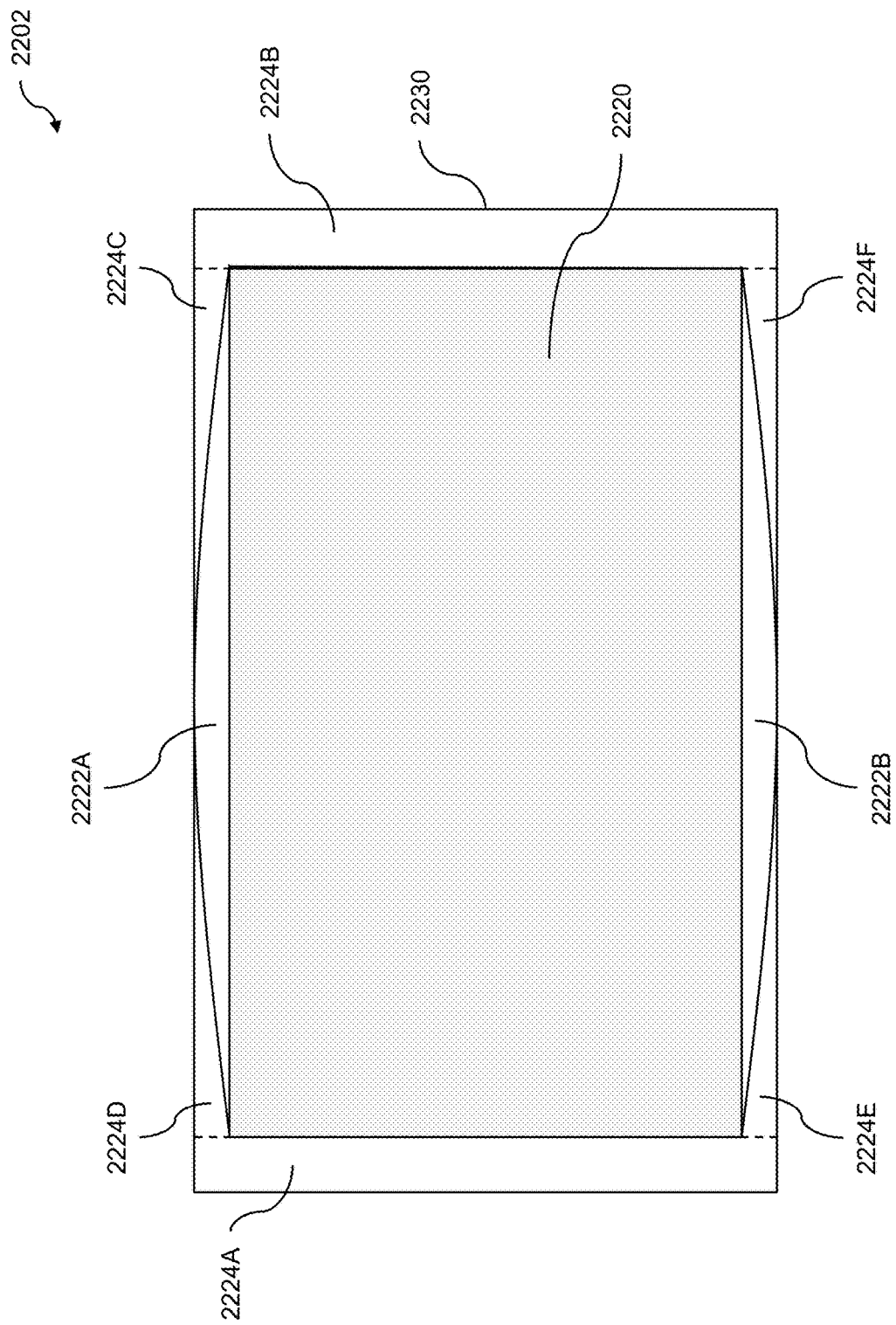
FIG. 22B illustrates expanded video as device viewport is rotated.

FIG. 22B illustrates expanded video as device viewport is rotated. On the other hand, in the proposed system, as shown in 2202, the original video is 2220 and the visible area on a viewport is 2230. The visible area 2230 fully contains the original video of 2220, which indicates no loss of video content in visible regions. The video is expanded to fill in the extended regions 2224 (as illustrated by 2224A and 2224B to the sides and 2224C-2224F to the top and bottom). Furthermore, 2222A on the top and 2222B on the bottom illustrate additional portions of video that are captured on the viewport (while they would be lost in the illustration 2200). In one implementation, the extended regions 2224 may be filled with video image that is generated by image processing and/or machine learning techniques to fill in the peripheral regions of the viewport 2230 beyond the size of the original video is 2220. For example, the content of the extended regions 2224 may be generated so as to show seamless extension of the video from size 2220 to viewport visible area 2230.

The video extrapolation or extend technology disclosed in FIGS. 22A and 22B allow users to view video on the viewport without any side or top edges as the viewport is tilted to the clockwise or counterclockwise direction compared to a vertical axis of the viewport.

Figure 23A:
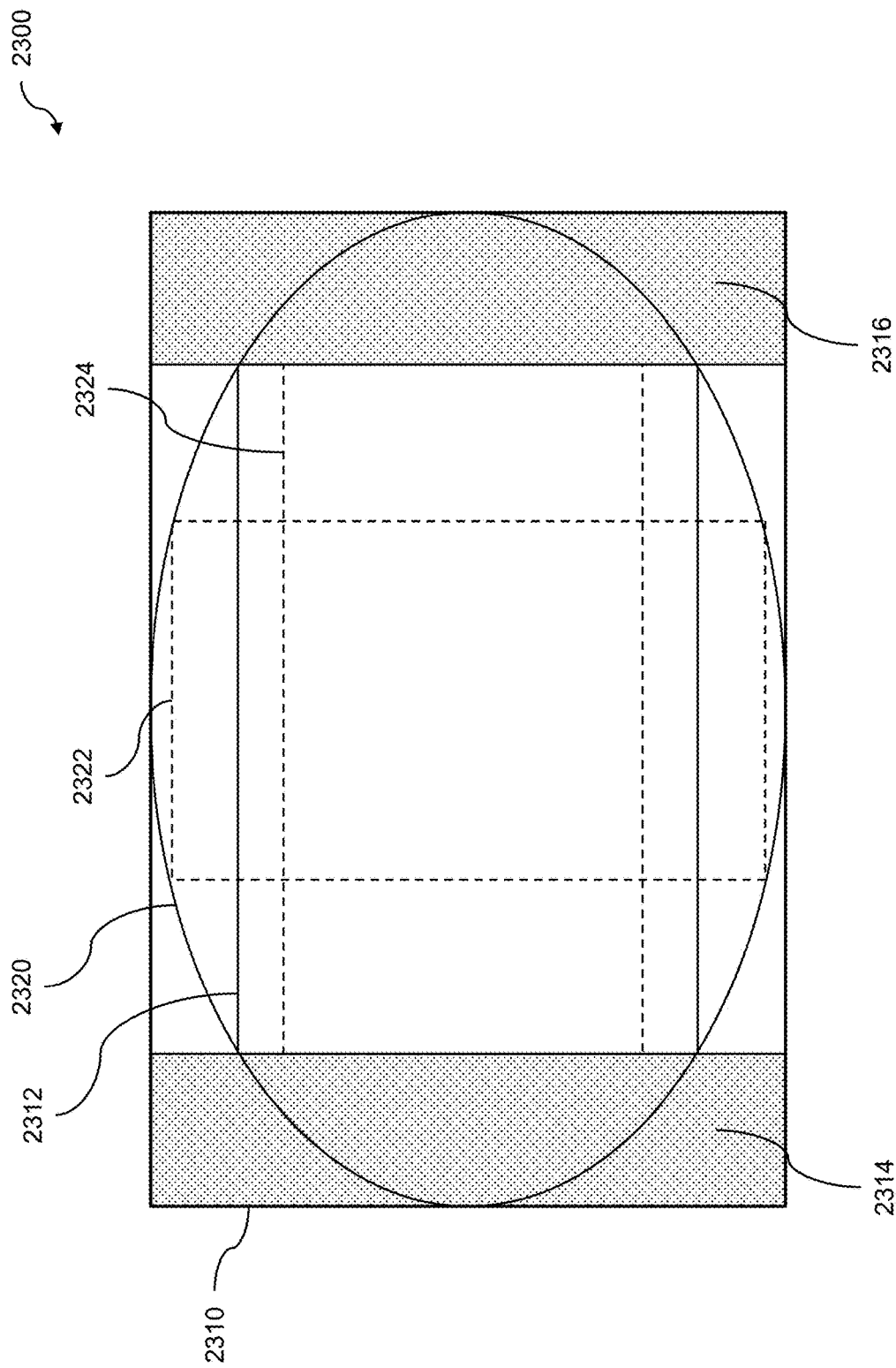
FIG. 23A shows a display with abandoned video portions.

FIG. 23A shows a display with abandoned video portions. Discussed throughout, a video, such as a movie, TV series, educational program, political message, etc., can be rendered on a display. In embodiments, portions of the video can be abandoned, where the abandonment can be based on parameters associated with the video and further parameters associated with a display. The abandoning of portions of the video can enable an enhanced or improved viewing of the video on the display due to differences between video and display capabilities, sizes, resolutions, and the like. Abandoning video portions enables an immersive video experience that includes rotation. A plurality of parameters pertaining to a video and a second plurality of parameters pertaining to a video display on a device are obtained. A minimum scale value is calculated to inscribe a rectangle within an oval based on a height and a width of the video, wherein a height and a width of the video display define the rectangle. A rectangular portion of the video is rendered on the video display, wherein the rectangular portion is on or inside boundaries of the oval.

Display of a video with abandoned video portions is shown 2300. The video 2310, can include a wide variety of video material, as described above and throughout. The video parameters associated with the video can include an aspect ratio, a resolution, a frame rate, a refresh rate, a color temperature, and the like. The minimum scale that can be calculated can be used to scale the video, resulting in a video 2312 that can fit within an oval 2320. Since the rectangle 2312 is smaller (in this example) than the original video, then portions of the video such as video portion 2314 and video portion 2316 can be abandoned. In embodiments, the abandonment of the video portions can be accomplished using wide-side trimming of the video. The scaled video can be viewed on an electronic device such as a laptop computer, a smartphone or PDA, a tablet, and the like. Further embodiments can include preprocessing the video using at least one of a video inset and a viewport inset. In this example, two viewports are shown: a viewport with zero degrees of rotation 2322, and a viewport with ninety degrees of rotation 2324. The viewport 2322 can show the video in a vertical or portrait format, and the viewport 2324 can show the video in a horizontal or landscape format.

Figure 23B:
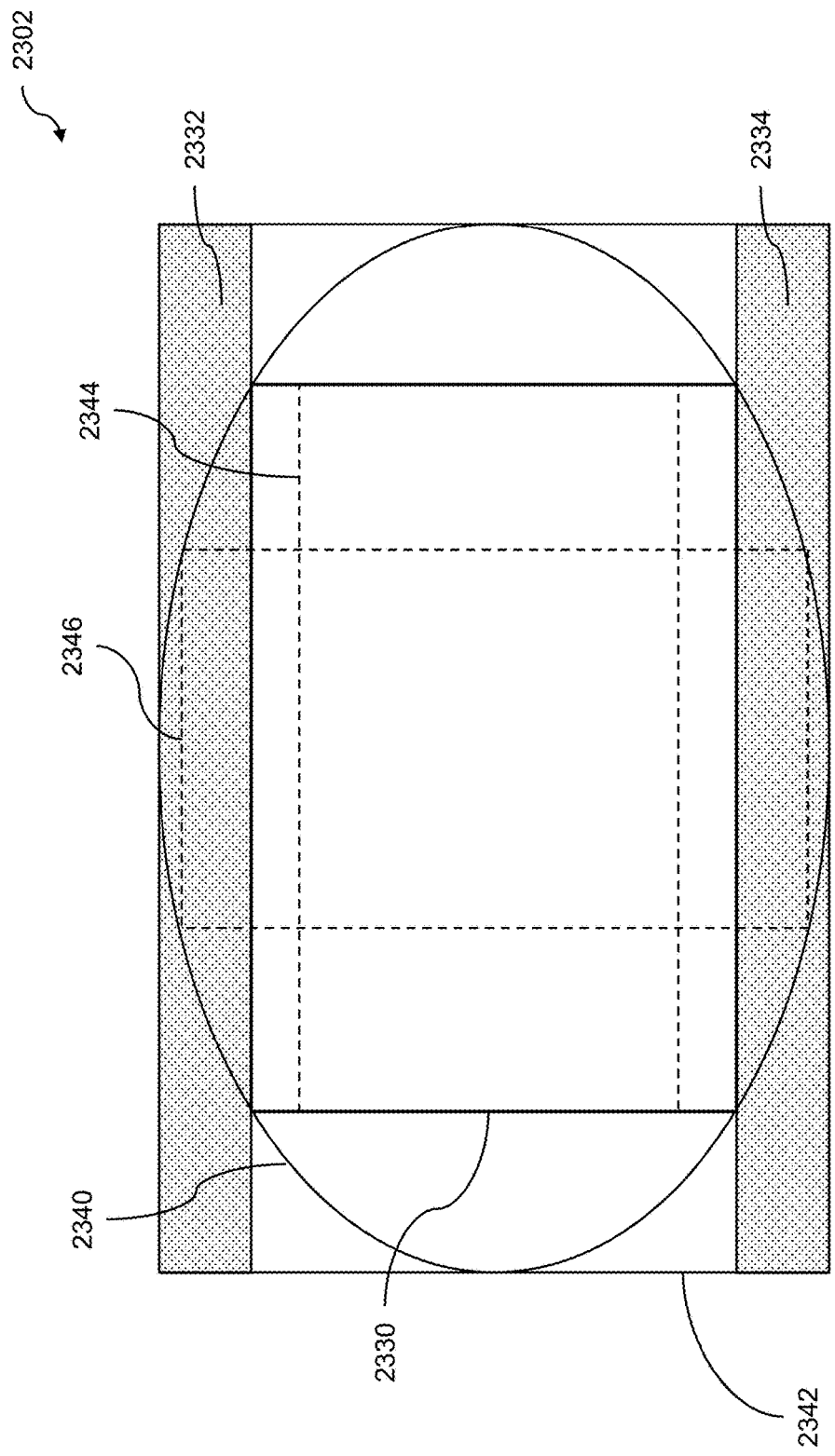
FIG. 23B shows a display with extended video portions.

FIG. 23B shows a display with extended video portions 2302. The video 2330 can be scaled and can be rendered on or inside the boundaries of an oval 2340. The rendering of the video can include displaying the video on a display associated with an electronic device such as a smartphone or tablet, a computing device such as a laptop computer, etc. The oval can have dimensions that enable the oval to fit within a rectangle 2342, where the rectangle can be defined by the width and the height of the device viewing area. The video can be scaled by a factor of one (e.g. unscaled or unaltered) or by another factor. The scaling can be applied to the height of the video and to the width of the video. In embodiments, the scaled value of the height and the scaled value of the width provide expansion of the video. The expansion of the video can include zooming into the video. In embodiments, the expansion of the video maximizes a visible area of the video within the video display. Discussed throughout, the video can be preprocessed using at least one of a video inset and a viewport inset. In the example, two viewports are shown: a horizontal or ninety-degree rotated viewport 2344, and a vertical or zero-degree rotated viewport 2346. Note that the vertical viewport extends above and below the boundaries of the video 2330. Embodiments include filling extended portions of the video with video image data. The extended portions of the video can include extended portion 2332 and extended portion 2334. The extended portions can be filled in using a variety of techniques. In an embodiment, the filling can be accomplished by generating the video image data by image processing. The video data can be generated using techniques including interpolation, extrapolation, and so on. In other embodiments, the filling can be accomplished by generating the video image data by machine learning. The machine learning can be used to analyze a scene and to predict what video image data can be included within extended portion or portions.

Figure 23C:
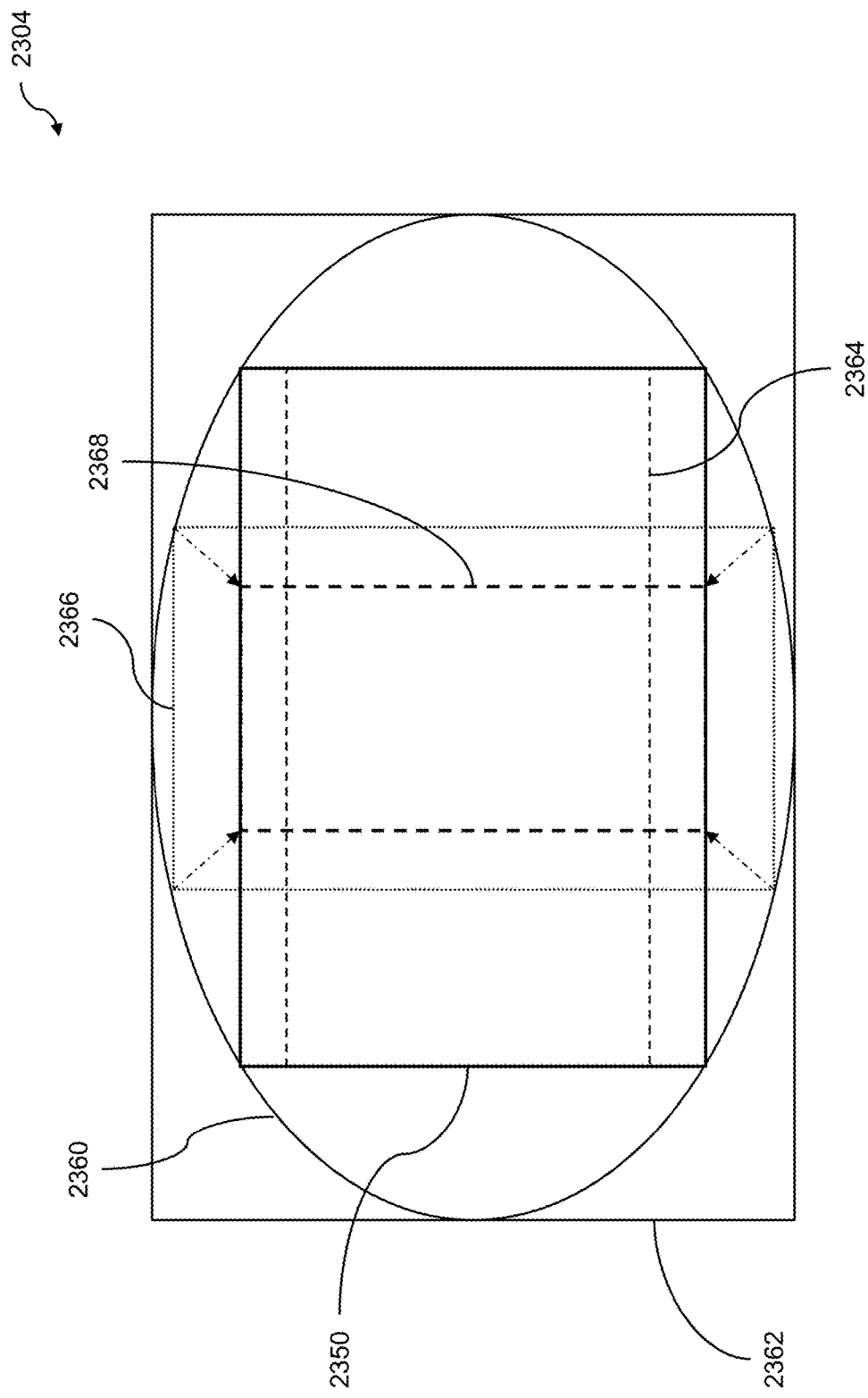
FIG. 23C shows a display with original video.

FIG. 23C shows a display with original video. The original video can be displayed within a viewport. The video can be scaled such that the viewport enables viewing of the original video region without abandoning video data, trimming video data, or filling in video data. A display with original data 2304 enables an immersive video experience including rotation. Discussed above and throughout, the video 2350 can be rendered on or inside the boundaries of an oval 2360, where the rendering of the video includes displaying the video on a personal electronic device, a computing device, and so on. The oval has height and width dimensions that enable the oval to fit within a rectangle 2362. The video can be scaled to fit within the oval or can be left unscaled. The scaling can expand the video to fit within the oval, where the expansion of the video can maximize the visible area of the video. As discussed previously, the video can be preprocessed using at least one of a video inset and a viewport inset. Two viewports are shown, including a horizontal, landscape, or ninety-degree rotated viewport 2364; and a vertical, portrait, or zero-degree rotated viewport 2366. Note that the vertical viewport extends above and below the boundaries of the video 2350. The viewport can be scaled such that the viewport includes the original video region 2368. By scaling the vertical viewport, the original video region can be used without requiring the extended portions of the video to be filled in or trimmed.

Figure 24:
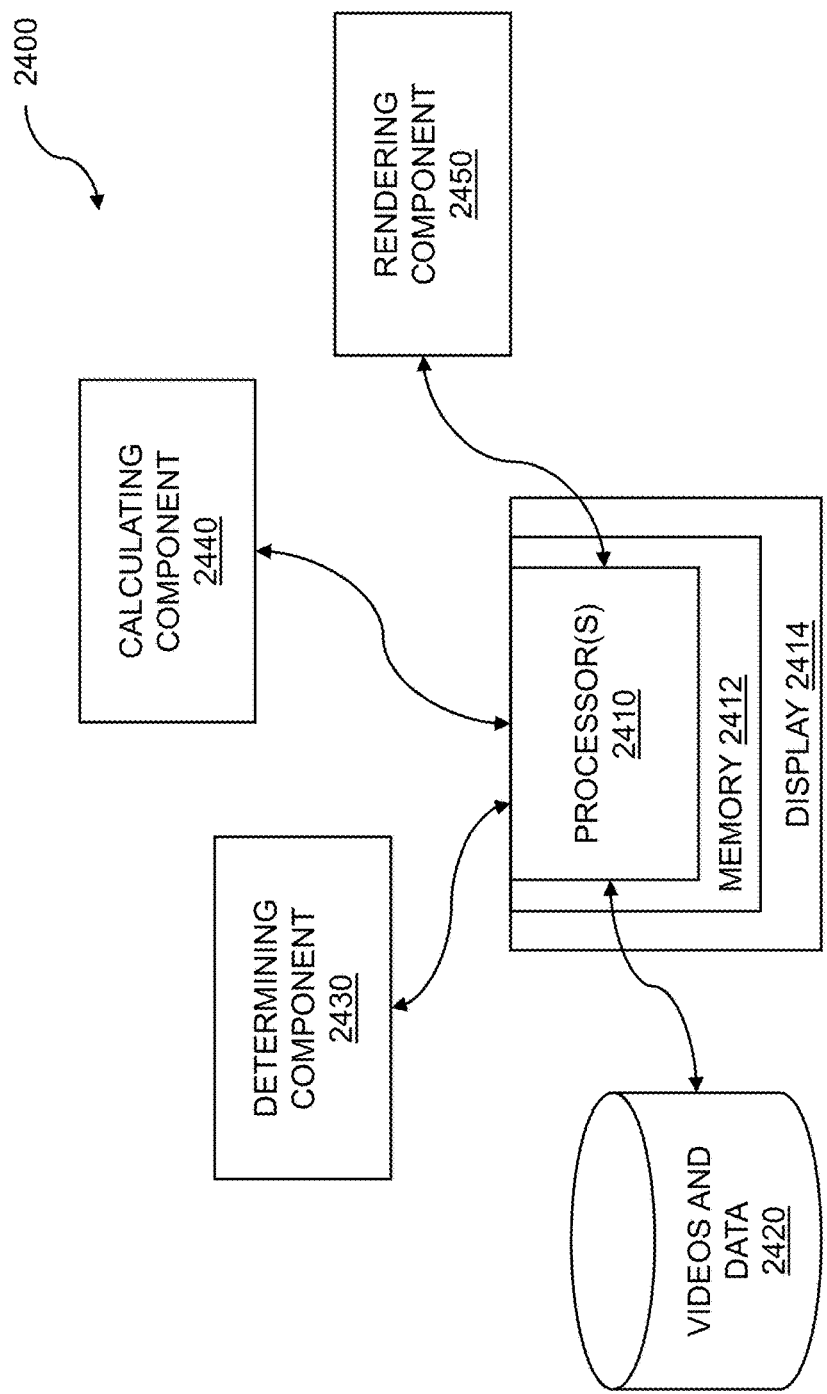
FIG. 24 is a system diagram for video manipulation.

FIG. 24 is a system diagram for video manipulation. Video manipulation is based on an immersive video experience that includes rotation. The system 2400 can include one or more processors 2410 attached to a memory 2412 which stores instructions. The system 2400 can include a display 2414 coupled to the one or more processors 2410 for displaying data, videos, intermediate steps, instructions, short-form videos, and so on. In embodiments, one or more processors 2410 are attached to the memory 2412 where the one or more processors, when executing the instructions which are stored, are configured to: determine a plurality of parameters pertaining to a video and a second plurality of parameters pertaining to a video display on a device; calculate a minimum scale value to inscribe a rectangle within an oval based on a height and a width of the video and wherein a height and a width of the video display define the rectangle; and render a rectangular portion of the video on the video display wherein the rectangular portion is on or inside boundaries of the oval.

The system 2400 can include a collection or repository of videos and data 2420. The videos and data 2420 may be stored in storage such as electronic storage coupled to the one or more processors, a database, one or more statically linked libraries, one or more dynamically linked libraries, or other appropriate video or data formats. The videos can include a variety of media content such as movies, television series, news programs, sporting events, political debates, and the like. The data can include data associated with video displays. The videos or other media content can present a story, an advertisement, a political message, an educational segment, and the like. The data associated with displays can include resolution information such as 5K, 4K, 1080P 720P, and so on. The data can include one or more color settings for a particular display, where a color setting can be selected based on the content of the video. The color settings can include a natural setting, a photograph setting, a movie setting, a gaming setting, etc. The data associated with one or more displays can be used to select a video content resolution appropriate for a video display. The system 2400 can include a determining component 2430. The determining component 2430 can include functions and instructions for determining a plurality of parameters pertaining to a video and a second plurality of parameters pertaining to a video display. The plurality of parameters pertaining to the video can include video content, resolution, duration, digital rights management information, and so on. Embodiments include determining various parameters of the video including size of the video, the size of a viewport, a rotation angle of a viewport, and a scale factor (discussed below). The second plurality of parameters pertaining to a video display can include display type, size, resolution, refresh rate, color temperature, etc.

The system 2400 can include a calculating component 2440. The calculating component 2440 can include functions and instructions for calculating a minimum scale value to inscribe a rectangle within an oval based on a height and a width of the video wherein a height and a width of the video display define the rectangle. In embodiments, the height and the width of the video define boundaries of the oval. The scale value can be based on the resolution of the video, the resolution of a screen on which the video can be rendered, and the like. Various techniques can be used to calculate a scale value. Embodiments include preprocessing a gravity sensor input using a low-pass filter before using it to determine the minimum scale value to inscribe the rectangle in the oval. The gravity sensor can be used to determine an orientation of a video display, a proximity of a display to an object or to a person, etc. Other embodiments include scaling the rectangle by α. The α is determined by:

$$\frac{(0.5\alpha \times \text{view width} \times \cos\theta + 0.5\alpha \times \text{view height} \times \sin\theta)^2}{(0.5 \times \text{video width})^2} + \frac{(0.5\alpha \times \text{view width} \times \sin\theta - 0.5\alpha \times \text{view height} \times \cos\theta)^2}{(0.5 \times \text{video height})^2} \leq 1$$

The scale can also be based on an estimate, a previously calculated value, etc. The scale can be based on a predetermined fixed scale. The predetermined fixed scale can be used for pre-zooming, maintaining the videos at a particular scale, etc. Further embodiments include using the various parameters, inputs, and boundary conditions to determine the minimum scale value.

The system 2400 can include a rendering component 2450. The rendering component 2450 can include functions and instructions for rendering a rectangular portion of the video on the video display wherein the rectangular portion is on or inside the boundaries of the oval. The rendering can be based on the gravity sensor data, trimming, zooming, and the like. The rendering can include displaying the video in the rectangle. As discussed throughout, displaying in the rectangle can be based on scaling, zooming, trimming, etc. The rendering can include a visible video mask, where the visible video mask can be generated by rotating the rectangle. In embodiments, the rendering can include communicating the visible video mask to a user and overlaying the visible video mask on a video recording device screen. The video recording device can include a digital video recording device such as a video camera, a web camera (webcam), etc. The rendering can be adjusted based on rotation of the video device.

Techniques for video manipulation based on an immersive video experience are disclosed. Parameters are determined that pertain to a video, and a second set of parameters are determined pertaining to a video display. A minimum scale value is calculated to inscribe a rectangle within an oval based on a height and a width of the video wherein the height and the width of the video define boundaries of the oval and wherein a height and a width of the video display define the rectangle. A rectangular portion of the video is rendered on the video display wherein the rectangular portion is on or inside the boundaries of the oval.

The system 2400 can include a computer program product embodied in a non-transitory computer readable medium for motion analysis, the computer program product comprising code which causes one or more processors to perform operations of: determining a plurality of parameters pertaining to a video and a second plurality of parameters pertaining to a video display on a device; calculating a minimum scale value to inscribe a rectangle within an oval based on a height and a width of the video and wherein a height and a width of the video display define the rectangle; and rendering a rectangular portion of the video on the video display wherein the rectangular portion is on or inside boundaries of the oval.

The system 2400 can include a computer system for motion analysis comprising: a memory which stores instructions; one or more processors coupled to the memory wherein the one or more processors, when executing the instructions which are stored, are configured to: determine a plurality of parameters pertaining to a video and a second plurality of parameters pertaining to a video display on a device; calculate a minimum scale value to inscribe a rectangle within an oval based on a height and a width of the video and wherein a height and a width of the video display define the rectangle; and render a rectangular portion of the video on the video display wherein the rectangular portion is on or inside boundaries of the oval. In embodiments, a computer-implemented method for video manipulation comprises: determining a plurality of parameters pertaining to a video and a second plurality of parameters pertaining to a video display on a device; calculating a minimum scale value to inscribe a rectangle within an oval based on a height and a width of the video and wherein a height and a width of the video display define the rectangle; and rendering a rectangular portion of the video on the video display wherein the rectangular portion is on or inside boundaries of the oval.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for immersive video manipulation comprising:
    determining a plurality of parameters pertaining to a video and a second plurality of parameters pertaining to a video display on a device;
    calculating, based on the plurality of parameters pertaining to the video, a minimum scale value to inscribe a rectangle within an oval, wherein a height and a width of the video display define the rectangle based on the second plurality of parameters pertaining to the video display on the device, wherein the oval has boundaries, and wherein the boundaries of the oval define a scaled value of the height of the video and a scaled value of the width of the video;
    computing a number of degrees of rotation of the video display;
    computing a zoom factor as a function of the number of degrees of rotation of the video display and the minimum scale value;
    applying the zoom factor to the video to create a rectangular portion of the video, wherein the rectangular portion comprises four vertices, wherein the zoom factor is applied continuously as a function of the number of degrees of rotation of the video display to enable immersive video viewing; and
    rendering the rectangular portion of the video on the video display, while maintaining video playback orientation as the video display rotates, wherein the rectangular portion is on or inside boundaries of the oval such that at least two vertices of the rectangular portion adjoin the oval, and variations in the number of degrees of rotation of the video display result in corresponding variations in the zoom factor, and the variations in the zoom factor result in corresponding variations in a percentage of the video contained in the rectangular portion of the video.

2. The method of claim 1 wherein the scaled value of the height and the scaled value of the width provide expansion of the video.

3. The method of claim 2 wherein the expansion of the video maximizes a visible area of the video within the video display.

4. The method of claim 1 further comprising filling extended portions of the video with video image data.

5. The method of claim 4 wherein the filling is accomplished by generating the video image data by image processing.

6. The method of claim 4 wherein the filling is accomplished by generating the video image data by machine learning.

7. The method of claim 4 wherein the filling covers peripheral regions of a video display beyond the original video.

8. The method of claim 7 wherein the peripheral regions are exposed when the video display is rotated.

9. The method of claim 1 wherein the rectangle is defined by the width and the height of the device viewing area.

10. The method of claim 1 further comprising determining if the device is substantially horizontal and processing various stop conditions in response to determining that the device is substantially horizontal.

11. The method of claim 1 further comprising preprocessing a gravity sensor input using a low-pass filter before using it to determine a minimum value of the scale to inscribe the rectangle in the oval.

12. The method of claim 1 further comprising preprocessing the video using at least one of a video inset and a viewport inset.

13. The method of claim 1 further comprising displaying the video in the rectangle.

14. The method of claim 1 further comprising trimming a wide side of the video by a predetermined percentage.

15. The method of claim 1 further comprising pre-zooming and maintaining the video at a predetermined fixed scale.

16. The method of claim 1 further comprising generating a visible video mask by rotating the rectangle.

17. The method of claim 16 further comprising communicating the visible video mask to a user and overlaying the visible video mask on a video recording device screen.

18. A computer program product embodied in a non-transitory computer readable medium for immersive video manipulation, the computer program product comprising code which causes one or more processors to perform operations of:
    determining a plurality of parameters pertaining to a video and a second plurality of parameters pertaining to a video display on a device;
    calculating, based on the plurality of parameters pertaining to the video, a minimum scale value to inscribe a rectangle within an oval, wherein a height and a width of the video display define the rectangle based on the second plurality of parameters pertaining to the video display on the device, wherein the oval has boundaries, and wherein the boundaries of the oval define a scaled value of the height of the video and a scaled value of the width of the video;
computing a number of degrees of rotation of the video display;
computing a zoom factor as a function of the number of degrees of rotation of the video display and the minimum scale value;
applying the zoom factor to the video to create a rectangular portion of the video, wherein the rectangular portion comprises four vertices, wherein the zoom factor is applied continuously as a function of the number of degrees of rotation of the video display to enable immersive video viewing; and
rendering the rectangular portion of the video on the video display, while maintaining video playback orientation as the video display rotates, wherein the rectangular portion is on or inside boundaries of the oval such that at least two vertices of the rectangular portion adjoin the oval, and variations in the number of degrees of rotation of the video display result in corresponding variations in the zoom factor, and the variations in the zoom factor result in corresponding variations in a percentage of the video contained in the rectangular portion of the video.

19. A computer system for immersive video manipulation comprising:
a memory which stores instructions;
one or more processors attached to the memory wherein the one or more processors, when executing the instructions which are stored, are configured to:
determine a plurality of parameters pertaining to a video and a second plurality of parameters pertaining to a video display on a device;
calculate, based on the plurality of parameters pertaining to the video, a minimum scale value to inscribe a rectangle within an oval, wherein a height and a width of the video display define the rectangle based on the second plurality of parameters pertaining to the video display on the device, wherein the oval has boundaries, and wherein the boundaries of the oval define a scaled value of the height of the video and a scaled value of the width of the video;
compute a number of degrees of rotation of the video display;
compute a zoom factor as a function of the number of degrees of rotation of the video display and the minimum scale value;
apply the zoom factor to the video to create a rectangular portion of the video, wherein the rectangular portion comprises four vertices, wherein the zoom factor is applied continuously as a function of the number of degrees of rotation of the video display to enable immersive video viewing; and
render the rectangular portion of the video on the video display, while maintaining video playback orientation as the video display rotates, wherein the rectangular portion is on or inside boundaries of the oval such that at least two vertices of the rectangular portion adjoin the oval, and variations in the number of degrees of rotation of the video display result in corresponding variations in the zoom factor, and the variations in the zoom factor result in corresponding variations in a percentage of the video contained in the rectangular portion of the video.

20. The method of claim 1 wherein all four vertices of the rectangular portion of the video adjoin the oval when the video display is in a horizontal or vertical position.

21. The method of claim 1 wherein a percentage of the video contained in the rectangular portion of the video when the video display is in a horizontal position differs from a percentage of the video contained in the rectangular portion of the video when the video display is in a vertical position.

22. The method of claim 5 wherein the image processing includes data interpolation.

23. The method of claim 22 wherein the image processing further includes data extrapolation.

24. The method of claim 1 wherein rotation of the video display is off-center with respect to a center of the oval.

\* \* \* \* \*